United States Patent
Sella et al.

(10) Patent No.: US 11,276,850 B2
(45) Date of Patent: Mar. 15, 2022

(54) SAME-SOLVENT PREPARATION OF ORGANIC ANODE SLURRIES

(71) Applicant: Storedot Ltd., Herzeliya (IL)

(72) Inventors: Eran Sella, Tel-Aviv (IL); Leora Shapiro, Ramat Gan (IL); Rony Schwarz, Kibbutz Ma'anit (IL); Moria Koren, Tel Aviv (IL); Maxim Kagan, Ness Ziona (IL)

(73) Assignee: STOREDOT LTD., Herzeliya (IL)

( * ) Notice: Subject to any disclaimer, the term of this patent is extended or adjusted under 35 U.S.C. 154(b) by 0 days.

(21) Appl. No.: 16/732,528

(22) Filed: Jan. 2, 2020

(65) Prior Publication Data
US 2021/0210746 A1    Jul. 8, 2021

(51) Int. Cl.
| | |
|---|---|
| *H01B 1/24* | (2006.01) |
| *H01M 4/00* | (2006.01) |
| *H01M 4/36* | (2006.01) |
| *H01M 4/62* | (2006.01) |
| *H01M 4/38* | (2006.01) |
| *H01M 4/02* | (2006.01) |

(52) U.S. Cl.
CPC .............. *H01M 4/362* (2013.01); *H01B 1/24* (2013.01); *H01M 4/386* (2013.01); *H01M 4/625* (2013.01); *H01M 2004/027* (2013.01)

(58) Field of Classification Search
CPC .. H01B 1/00; H01B 1/22; H01B 1/24; H01M 4/04; H01M 4/08; H01M 4/386; C09D 5/24
See application file for complete search history.

(56) References Cited

U.S. PATENT DOCUMENTS

| | | | |
|---|---|---|---|
| 9,406,927 B1 * | 8/2016 | Burshtain | ........... H01M 4/0471 |
| 10,199,677 B2 | 2/2019 | Drach et al. | |
| 10,367,193 B2 * | 7/2019 | Burshtain | ............. H01M 4/386 |

(Continued)

OTHER PUBLICATIONS

Leblanc et al "Silicon as anode for high-energy lithium ion batteries: from molten ingot to nanoparticles", Journal of Power Sources 299 (2015) 529-536.*

(Continued)

*Primary Examiner* — Mark Kopec
(74) *Attorney, Agent, or Firm* — Reches Patent

(57) ABSTRACT

Methods of preparing Si-based anode slurries and anode made thereof are provided. Methods comprise coating silicon particles within a size range of 300-700 nm by silver and/or tin particles within a size range of 20-500 nm, mixing the coated silicon particles with conductive additives and binders in a solvent to form anode slurry, and preparing an anode from the anode slurry. Alternatively or complementarily, silicon particles may be milled in an organic solvent, and, in the same organic solvent, coating agent(s), conductive additive(s) and binder(s) may be added to the milled silicon particles—to form the Si-based anode slurry. Alternatively or complementarily, milled silicon particles may be mixed, in a first organic solvent, with coating agent(s), conductive additive(s) and binder(s)—to form the Si-based anode slurry. Disclosed methods simplify the anode production process and provide equivalent or superior anodes.

16 Claims, 13 Drawing Sheets
(5 of 13 Drawing Sheet(s) Filed in Color)

(56) References Cited

U.S. PATENT DOCUMENTS

| | | | | |
|---|---|---|---|---|
| 2013/0295454 | A1* | 11/2013 | Huang | H01M 4/628 |
| | | | | 429/211 |
| 2016/0164085 | A1* | 6/2016 | Hanelt | C01B 33/02 |
| | | | | 429/218.1 |
| 2017/0294687 | A1 | 10/2017 | Burshtain et al. | |
| 2018/0212234 | A1* | 7/2018 | Haufe | H01M 4/364 |
| 2019/0088933 | A1* | 3/2019 | Maurer | H01M 4/0404 |
| 2019/0148774 | A1 | 5/2019 | Kuks et al. | |
| 2019/0198912 | A1 | 6/2019 | Sella et al. | |
| 2019/0356013 | A1 | 11/2019 | Sella et al. | |

OTHER PUBLICATIONS

Suzuki et al "Effects of fluids on vibration ball mill grinding", Journal of Chemical Engineering of Japan, vol. 19, No. 3, 1986 pp. 191-195.*

Cabello et al "Towards a high-power Si@graphite anode for lithium ion battereies through a wet ball milling process", Molecules 2020, 25, 2494 (14 pages).*

Hou et al "The synergistic effects of combining the high energy mechanical milling and wet milling on Si negative electrode materials for lithium ion battery", Journal of Power Sources, 349 (2017) 111-120.*

Qian et al "Two-step ball-milling synthesis of a Si/SiOx/C composite electrode for lithium ion batteries with excellent long-term cycling stability", RSC Adv., 2017, 7, 36697.*

Kepler et al., "Copper-tin anodes for rechargeable lithium batteries: an examples of the matrix effect in an intermetallic system" Journal of Power Sources 81-82, 1999. pp. 383-387.

Kepler et al., "LixCu6Sn5 (0 < x < 13): An Intermetallic Insertion Electrode for Rechargeable Lithium Batteries" Electrochemical and Solid-State Letters, 2 (7) 307-309 (1999).

Wang et al., "Lithium storage properties of nanocrystalline eta-Cu 6 Sn 5 alloys prepared by ball-milling" Journal of Alloys and Compounds 299, L12-L15, 2000.

Lee et al. "Fabrication of Carbon-Encapsulated Mono- and Bimetallic (Sn and Sn/Sb Alloy) Nanorods. Potential Lithium-Ion Battery Anode Materials" Chem. Mater. 2009, 21, 2306-2314.

Wang et al., Sn/graphene nanocomposite with 3D architecture for enhanced reversible lithium storage in lithium ion batteries Journal of Materials Chemistry, 2009, vol. 19, pp. 8378-8384.

Jo et al., "Synthesis and characterization of low temperature Sn nanoparticles for the fabrication of highly conductive ink" Nanotechnology 22 (2011) 225701 (8pp).

He et al., "Monodisperse Antimony Nanocrystals for High-Rate Li-ion and Na-ion Battery Anodes: Nano versus Bulk" Nano Lett. 2014, 14, 3, 1255-1262.

Touidjine et al., "Partially Oxidized Silicon Particles for Stable Aqueous Slurries and Practical Large-Scale Making of Si-Based Electrodes" Journal of The Electrochemical Society, 162 (8) A1466-A1475 (2015).

Wang et al., "Three-Dimensional Porous Carbon Nanosheet Networks Anchored with $Cu_6Sn_5$@Carbon as a High-Performance Anode Material for Lithium Ion Batteries" Electronic Supplementary Material (ESI) for RSC Advances 2016.

Yang et al., "Effects of lithium fluoride coating on the performance of nano-silicon as anode material for lithium-ion batteries" Materials Letters 184 (2016) 65-68.

Zhong et al., "Tin nanoparticles as an effective conductive additive in silicon anodes" Scientific Reports vol. 6, Article No. 30952 (2016).

Liu et al., "A dual functional wrapping layer for enhanced cyclic performance of high-loading silicon anodes" Electrochimica Acta 240 (2017) 1-6.

Zhang et al., "Silicon Nanoparticles: Stability in Aqueous Slurries and the Optimization of the Oxide Layer Thickness for Optimal Electrochemical Performance" ACS Appl. Mater. Interfaces 2017, 9, 32727-32736.

Hays et al., "Si Oxidation and $H_2$ Gassing During Aqueous Slurry Preparation for Li-Ion Battery Anodes" J. Phys. Chem. C 2018, 122, 18, 9746-9754, including supporting information.

Rodrigues et al., "Quantifying gas generation from slurries used in fabrication of Si-containing electrodes for lithium-ion cells" Journal of Power Sources 395 (2018) pp. 289-294.

Yao et al., "Chemical Reduction Synthesis and Electrochemistry of Si—Sn Nanocomposites as High-Capacity Anode for Li-Ion Batteries" J. Phys. Chem. Lett., Aug. 21, 2018.

Yuan et al., "SnSb alloy nanoparticles embedded in N-doped porous carbon nanofibers as a high-capacity anode material for lithium-ion batteries" Journal of Alloys and Compounds, vol. 777, Mar. 10, 2019, pp. 775-783.

Qu et al., "Origin of the Increased $Li^+$-Storage Capacity of Stacked $SnS_2$/Graphene Nanocomposite" vol. 2, Issue 8, Aug. 2015, pp. 1138-1143.

* cited by examiner

SAME-SOLVENT PREPARATION OF ORGANIC ANODE SLURRIES

BACKGROUND OF THE INVENTION

1. Technical Field

The present invention relates to the field of lithium ion batteries, and more particularly, to anode material particles, mixtures thereof and anode prepared therefrom.

2. Discussion of Related Art

Continuous effort is made to develop lithium ion batteries with larger capacity, enhanced safety and higher charging rates. Silicon (Si) as anode active material provides larger capacity, but is reactive and requires careful handling in a non-oxidizing environment.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an anode active material for fast-charging lithium ion batteries, the anode active material comprising silicon particles within a size range of 100-1200 nm, coated by silver and/or tin particles within a size range of 20-500 nm.

One aspect of the present invention provides a method comprising: coating silicon particles within a size range of 300-700 nm by silver and/or tin particles within a size range of 20-500 nm, mixing the coated silicon particles with conductive additives and binders in a solvent to form an anode slurry, and preparing an anode from the anode slurry.

One aspect of the present invention provides a method of preparing a Si-based anode slurry, the method comprising: milling silicon particles in an organic solvent to yield milled silicon particles, and in the same organic solvent, adding to the milled silicon particles at least one coating agent, at least one conductive additive and at least one binder—to form the Si-based anode slurry.

One aspect of the present invention provides a method of preparing a Si-based anode slurry, the method comprising: mixing milled silicon particles, in a first organic solvent, with at least one coating agent, at least one conductive additive and at least one binder—to form the Si-based anode slurry.

One aspect of the present invention provides a method comprising: forming a mixture of silicon particles with nanoparticles (NPs) and a carbon-based binder and/or surfactant, wherein the NPs comprise at least one of: metalloid oxide NPs, metalloid salt NPs, Sb and/or Cu salt NPs, Sn, Sb, Cu, SnSb alloy and/or SnCu alloy NPs, metallic Ag, Au, Pb and/or Ge NPs, and carbon NPs, reducing the mixture to yield a reduced mixture comprising coated silicon particles having a passivation coating, and consolidating the reduced mixture to form an anode.

One aspect of the present invention provides a mixture of anode material particles comprising coated silicon particles having, covering the particles, respective passivation layers that inhibit reactions of the Si in an oxidizing environment.

One aspect of the present invention provides an anode for fast charging lithium ion batteries, the anode comprising a reduced mixture of coated silicon particles having respective passivation layers, consolidated with a binder and conductive materials from a water-based slurry to form the anode, wherein the mixture is reduced from a mixture of the silicon particles with nanoparticles (NPs) and a carbon-based binder and/or surfactant, and wherein the NPs comprise at least one of: metalloid oxide NPs, metalloid salt NPs, Sb and/or Cu salt NPs, Sn, Sb, Cu, SnSb alloy and/or SnCu alloy NPs, metallic Ag, Au, Pb and/or Ge NP, and carbon NPs.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1 is a high-level schematic illustration of a method of preparing a Si-based anode slurry to form anodes, according to some embodiments of the invention.

Figure 2A:
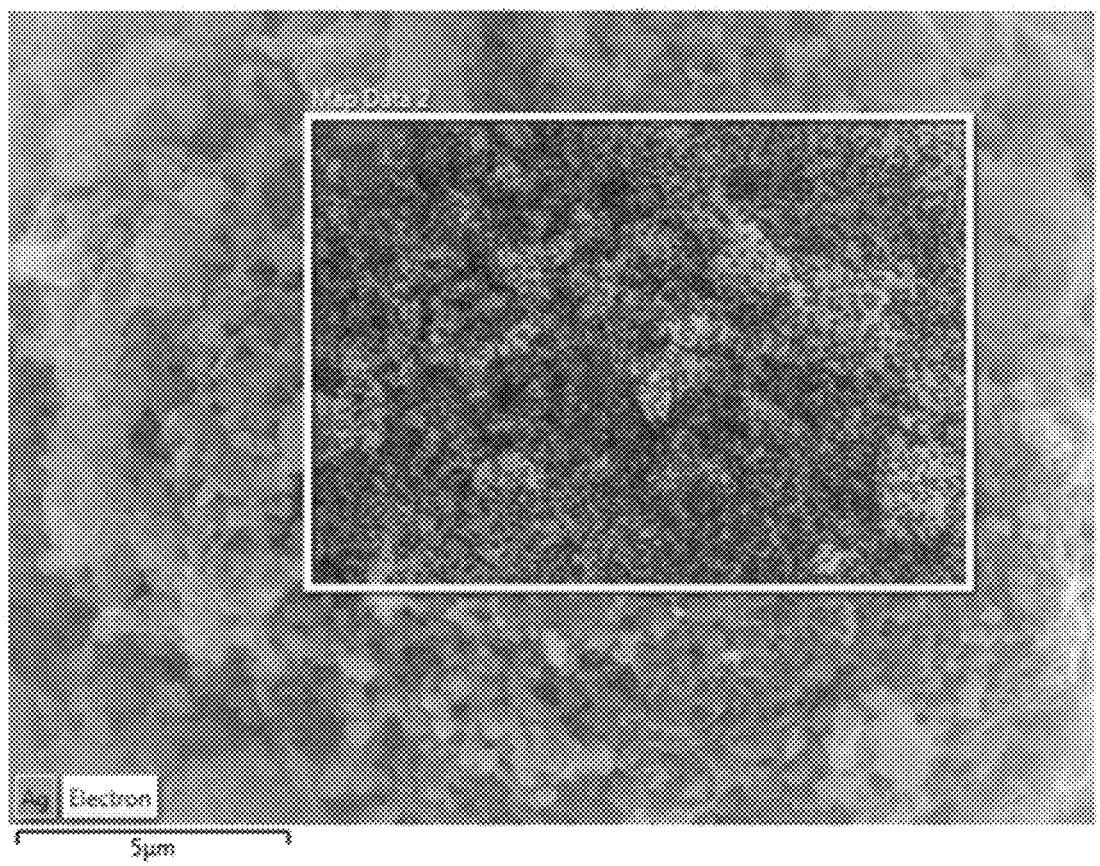
Figure 2B:
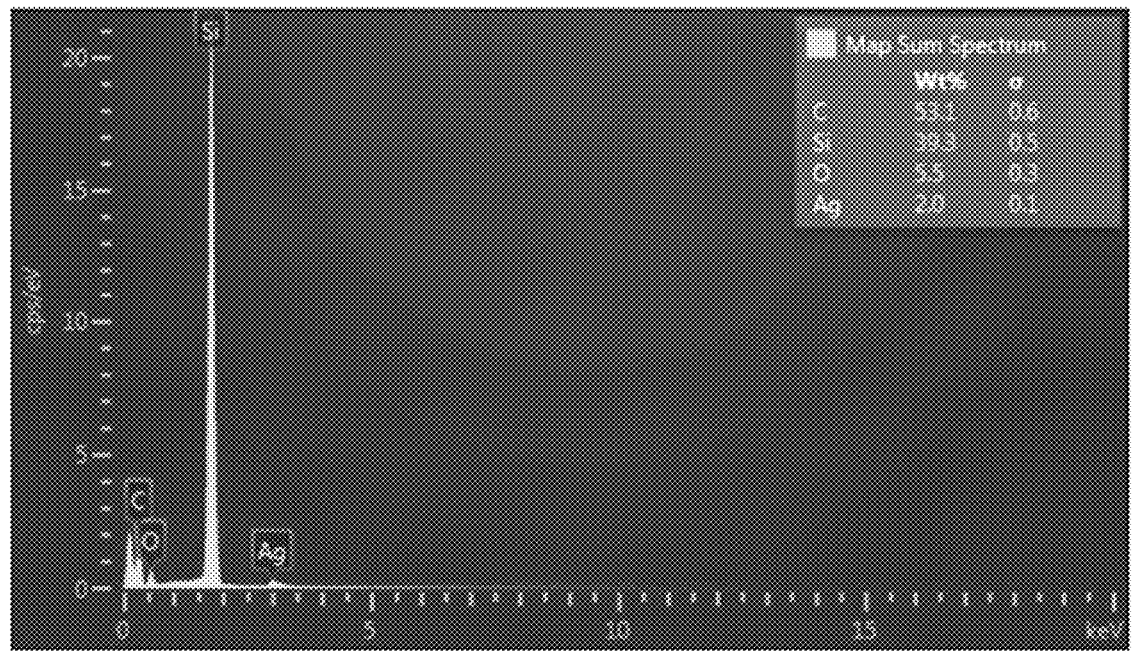

FIGS. 2A and 2B provide a SEM (Scanning electron microscope) image and EDS (Energy-dispersive X-ray spectroscopy) analysis, respectively, showing nano silver particles in a relatively uniform coating layer on the anode, according to some embodiments of the invention.

Figure 3:
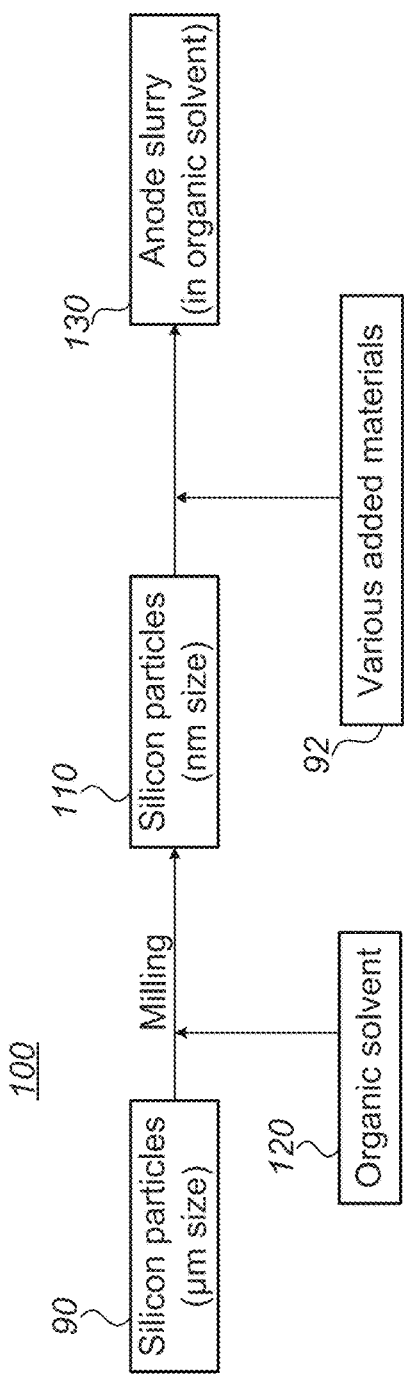
Figure 4:
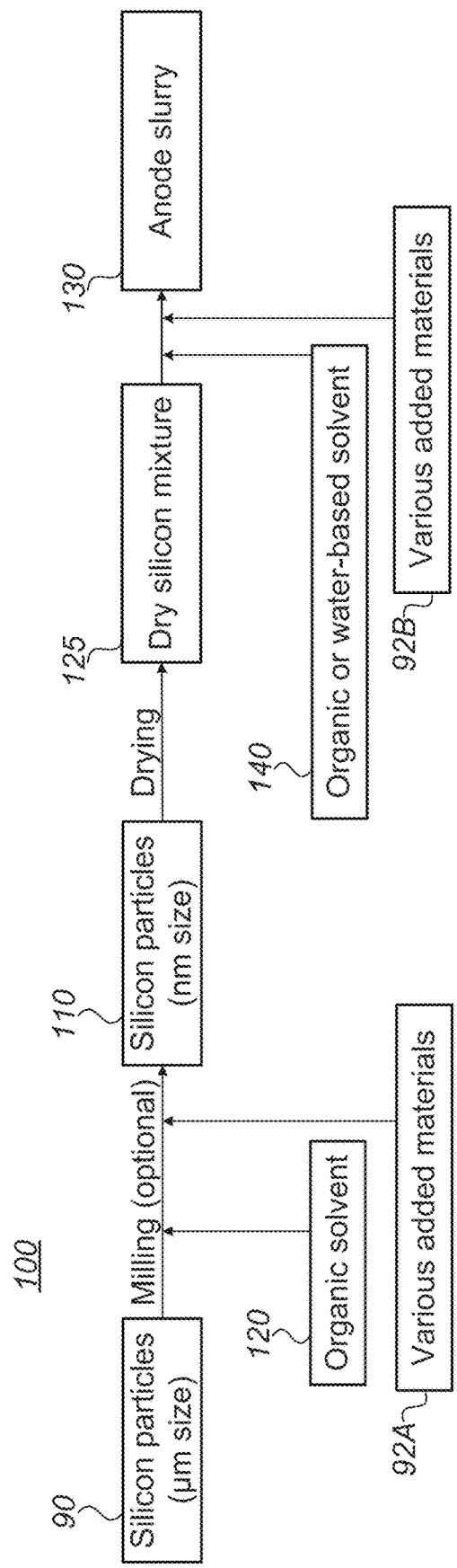

FIGS. 3 and 4 are high-level schematic illustrations of methods of preparing Si-based anode slurries, according to some embodiments of the invention.

Figure 5A:
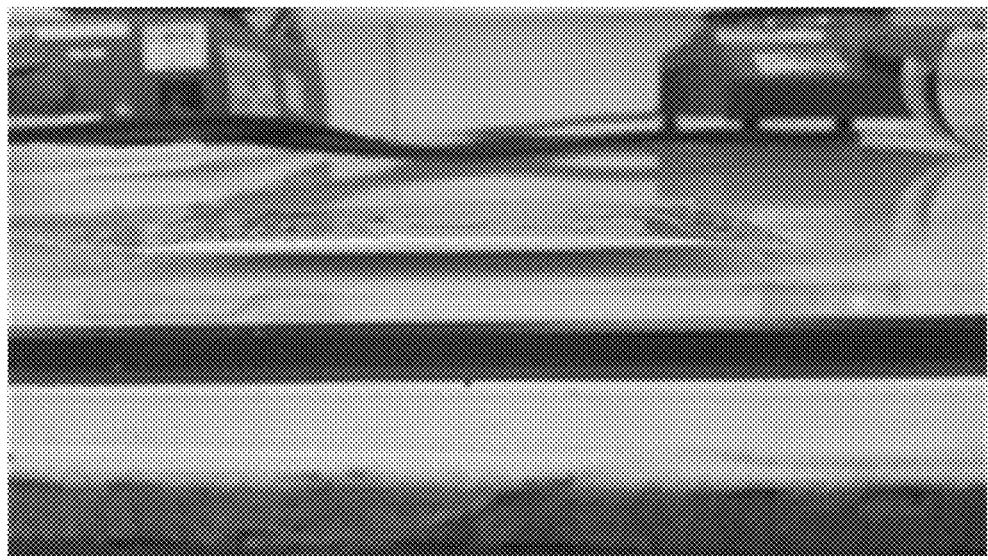
Figure 5B:
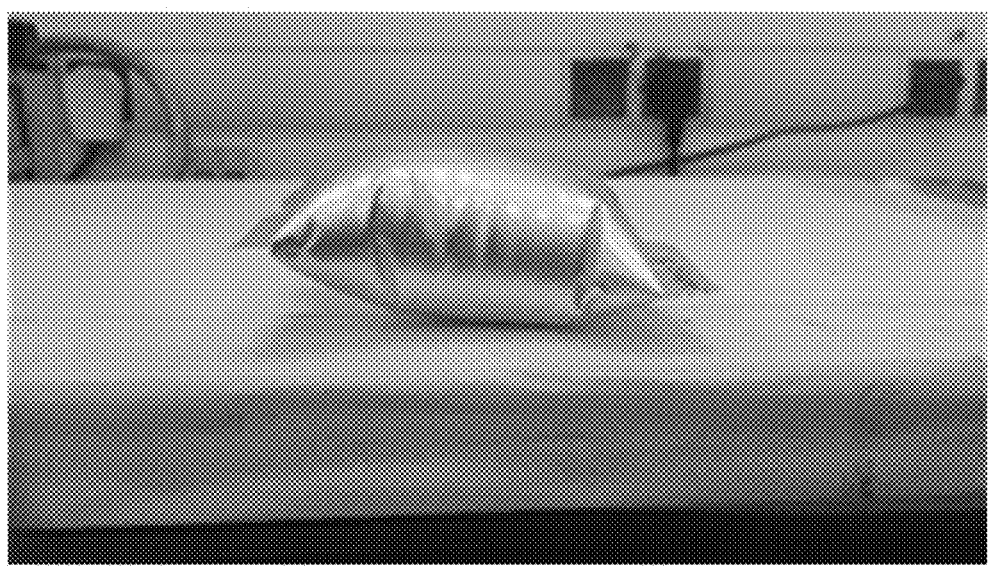

FIGS. 5A and 5B provide images of reactivity experiments of anode slurries enclosed in pouches, comparing unprotected Si anode material in butanol, according to some embodiments of the invention, with unprotected Si anode material in water.

Figure 6:
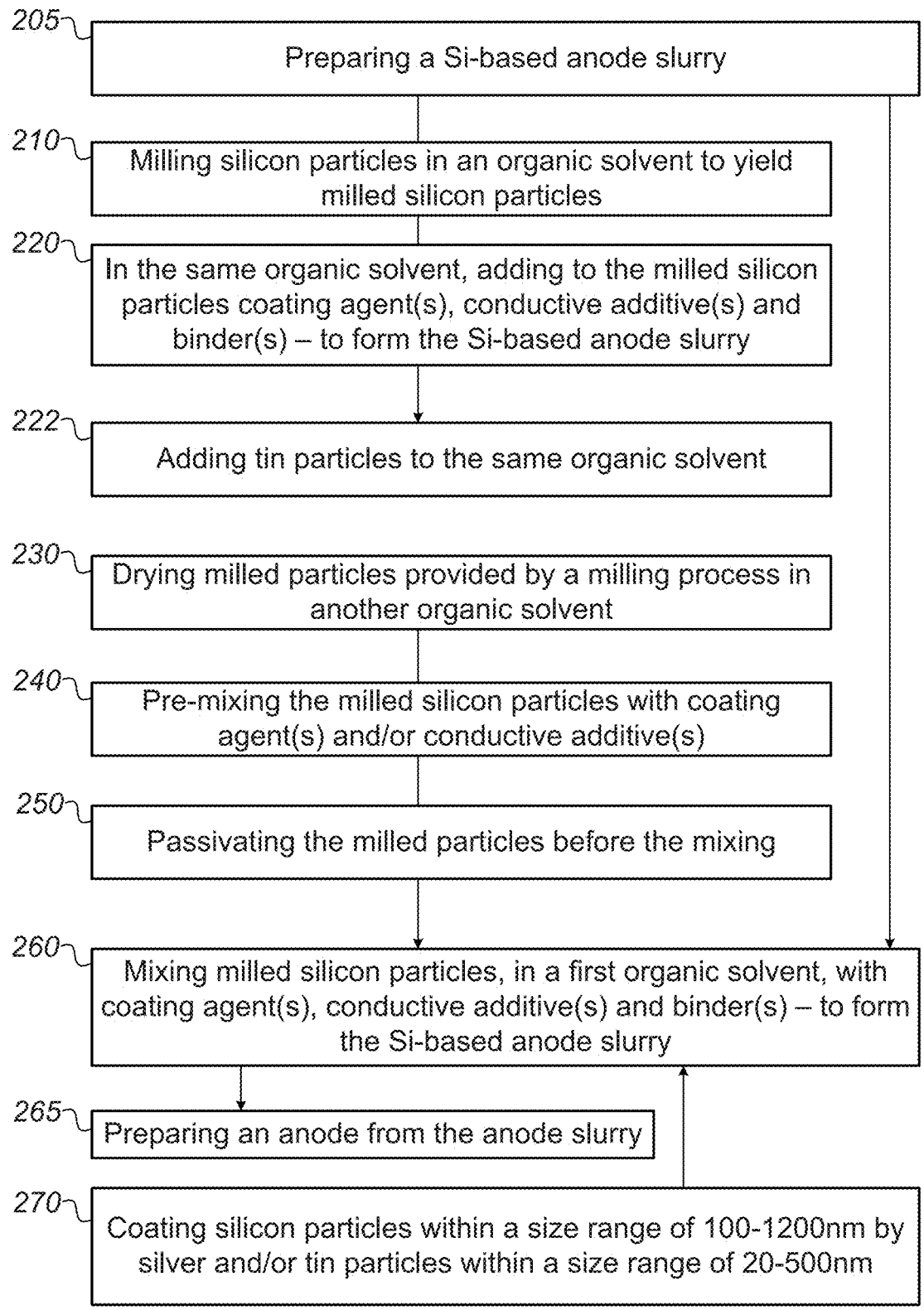
Figure 7:
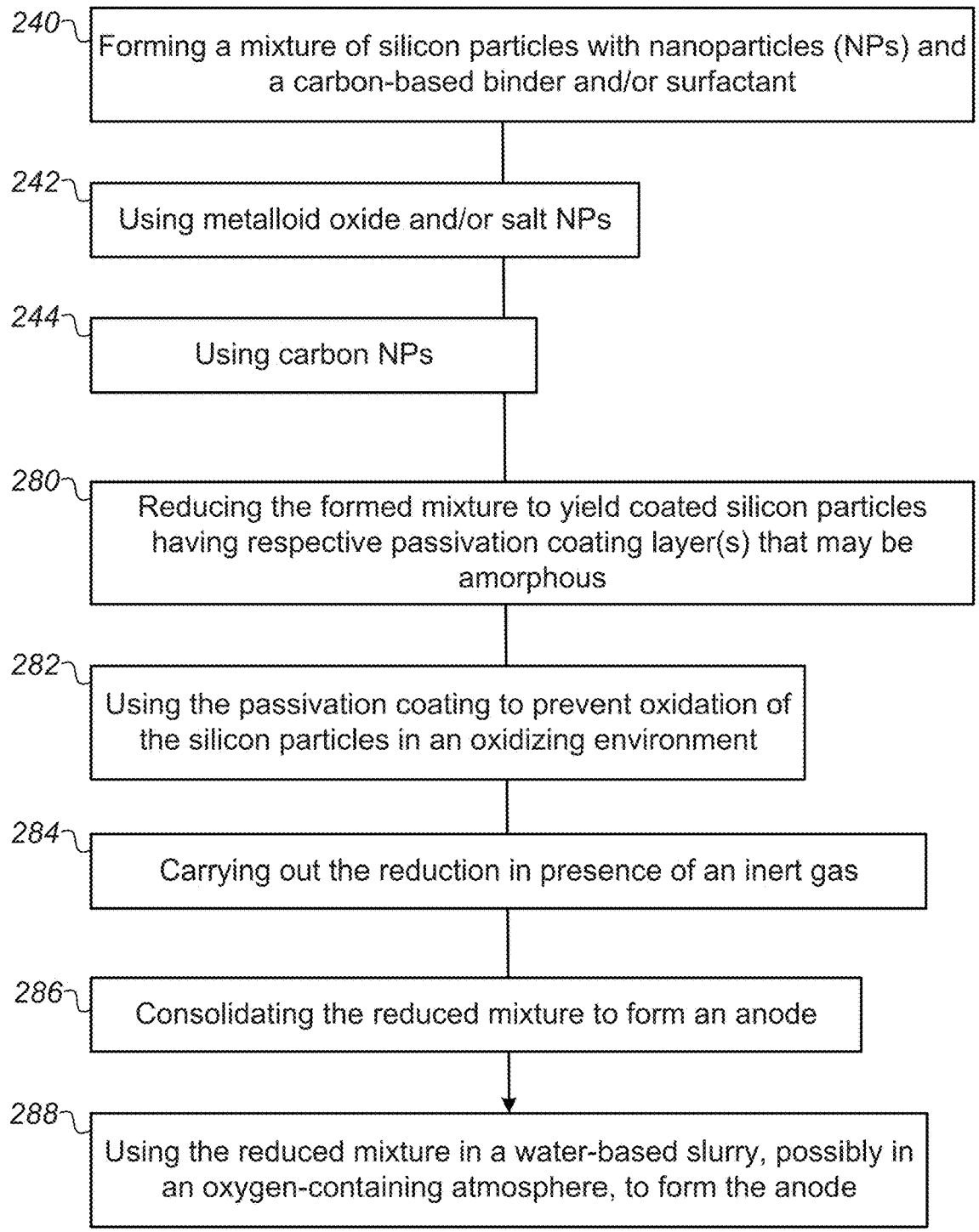

FIGS. 6 and 7 are high-level schematic flowcharts illustrating methods, according to some embodiments of the invention.

Figure 8:
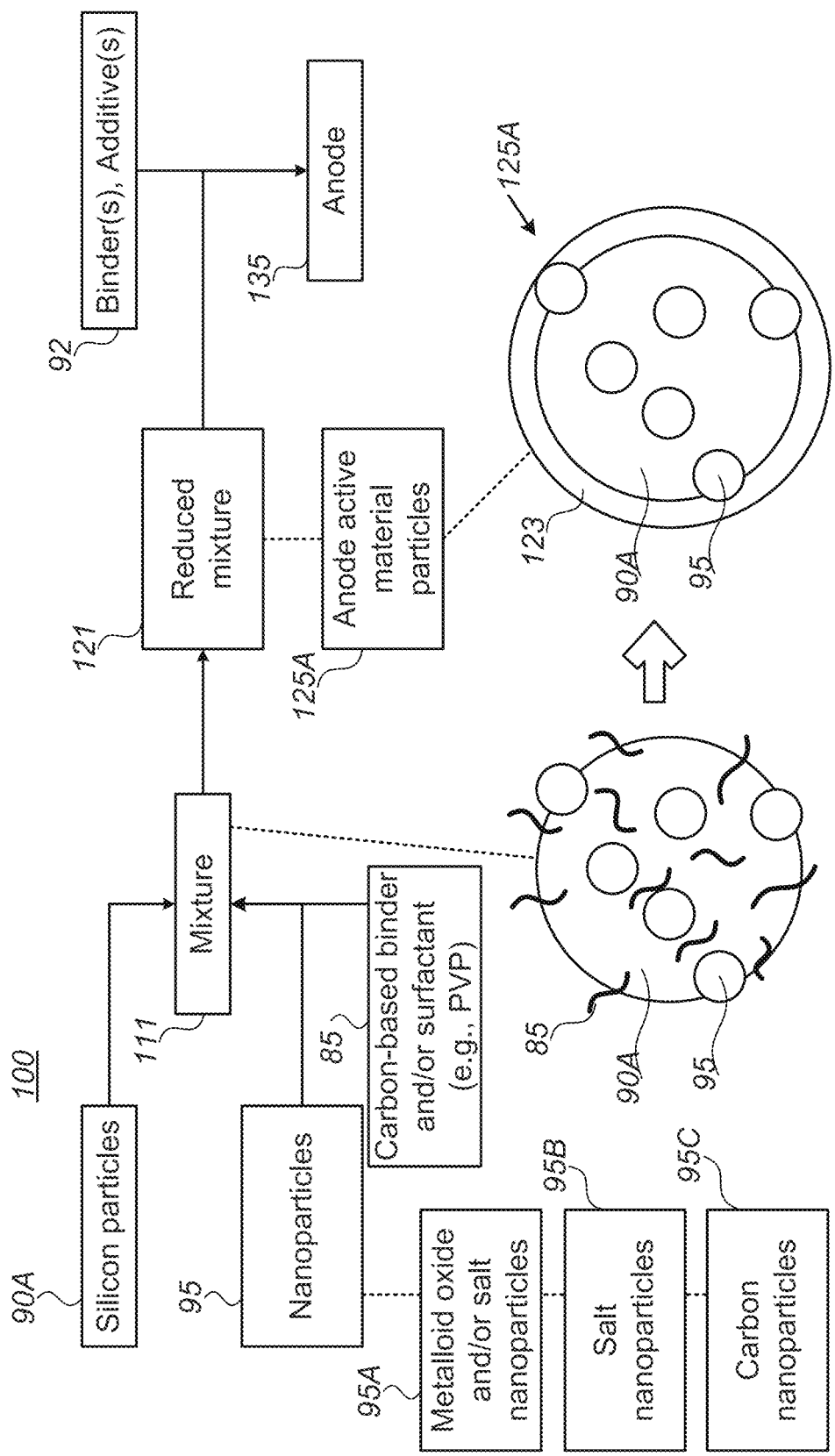

FIG. 8 is a high-level schematic illustration of methods and materials forming the anode active materials and the anodes, according to some embodiments of the invention.

Figure 9A:
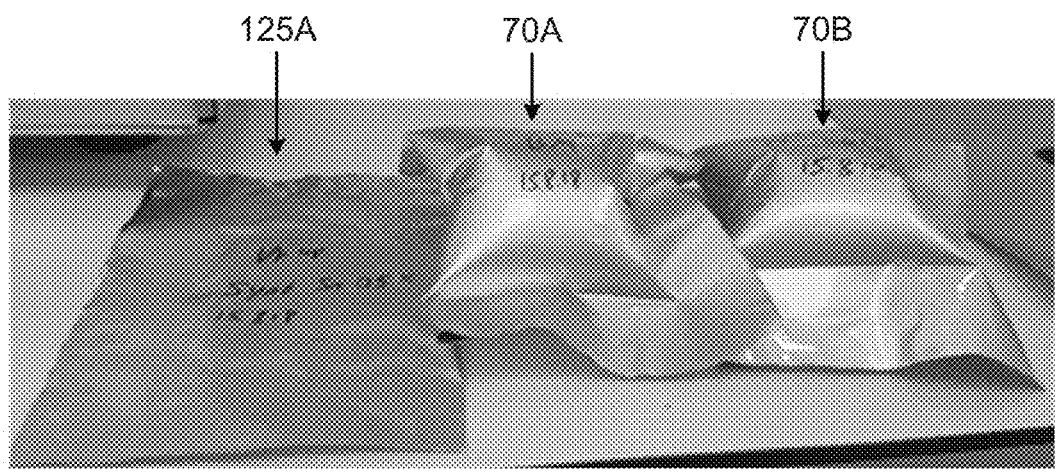
Figure 9B:
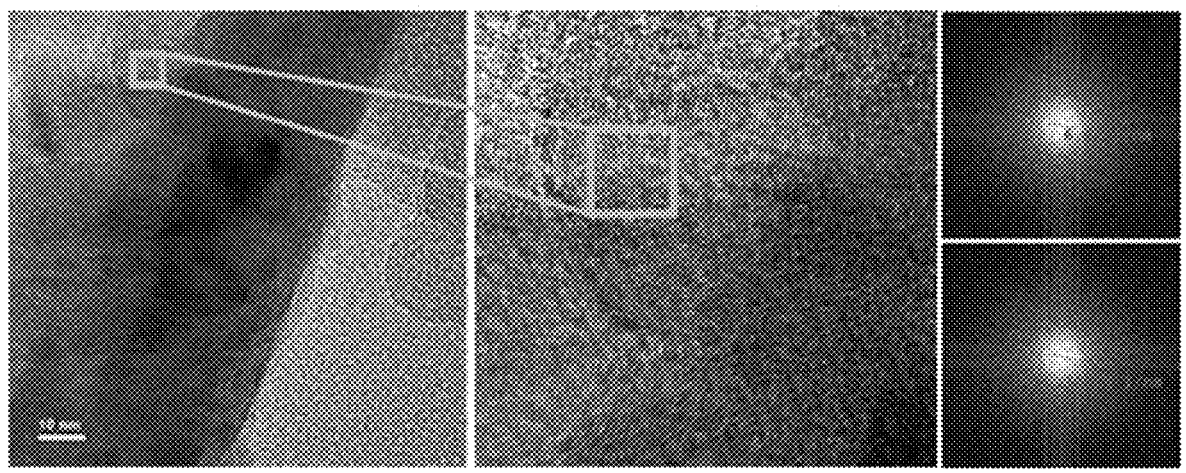
Figure 9C:
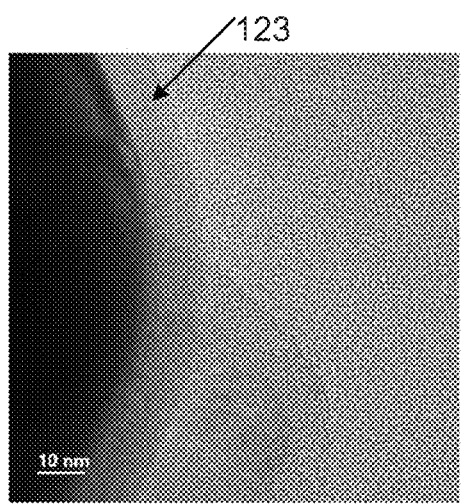

FIGS. 9A-9C provide experimental indications for characteristics and advantages of disclosed methods and anode active material particles, according to some embodiments of the invention.

Figure 10A:
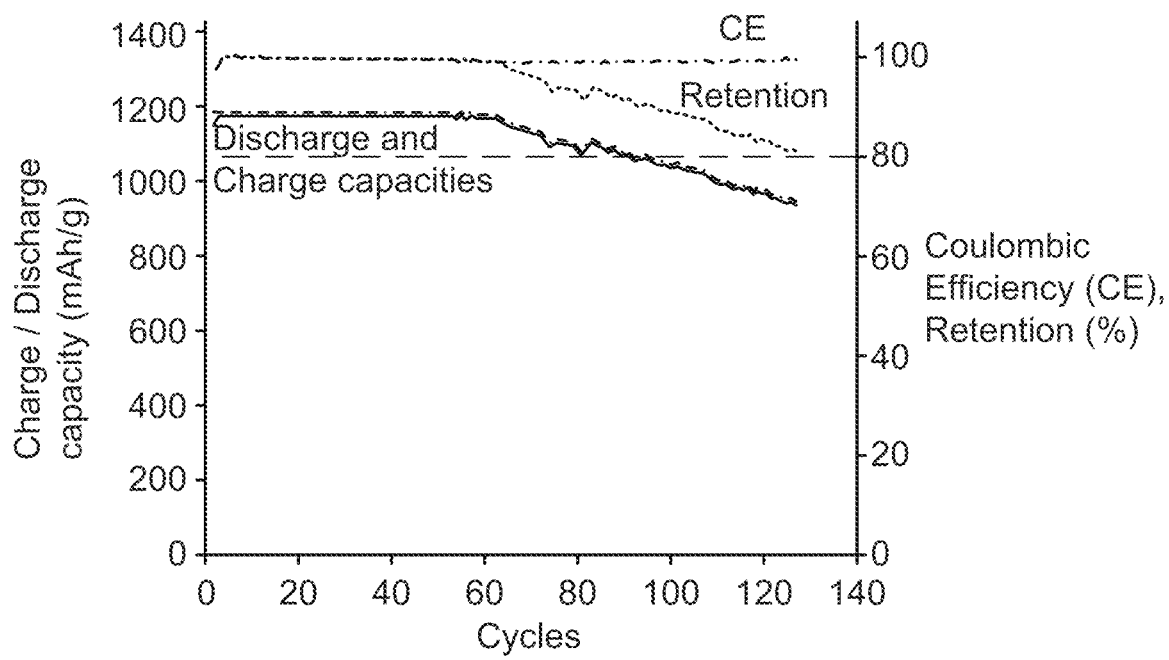
Figure 10B:
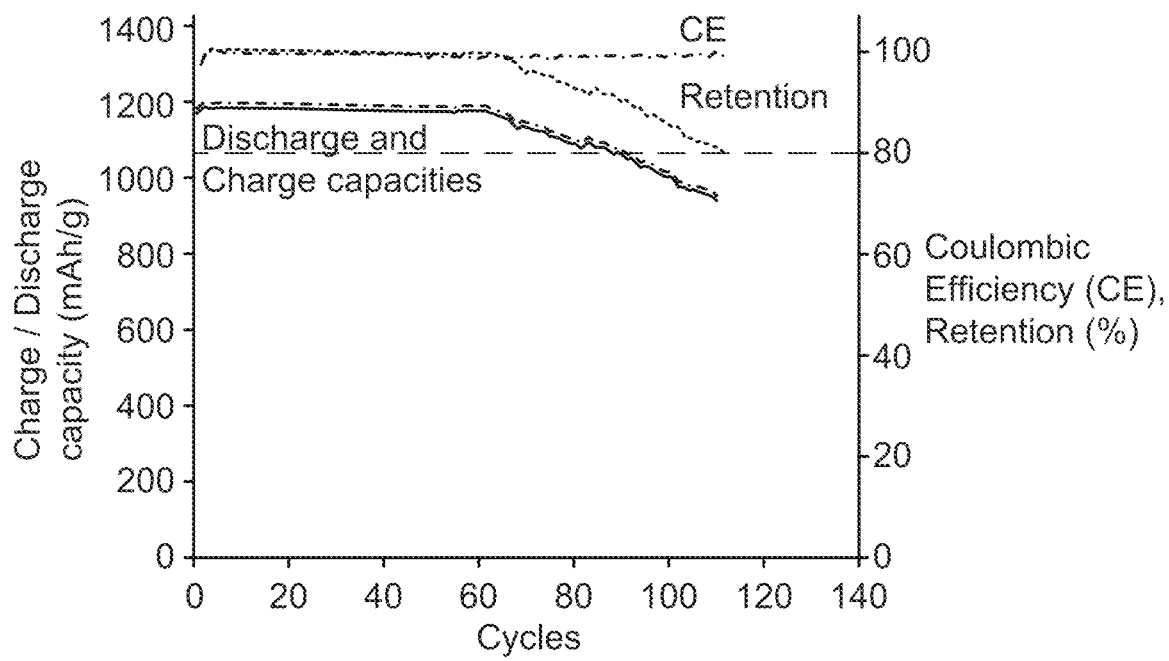

FIGS. 10A and 10B provide a comparison of anode performance for disclosed anode preparation processes, with and without addition of Sn NP, respectively, according to some embodiments of the invention.

Figure 10C:
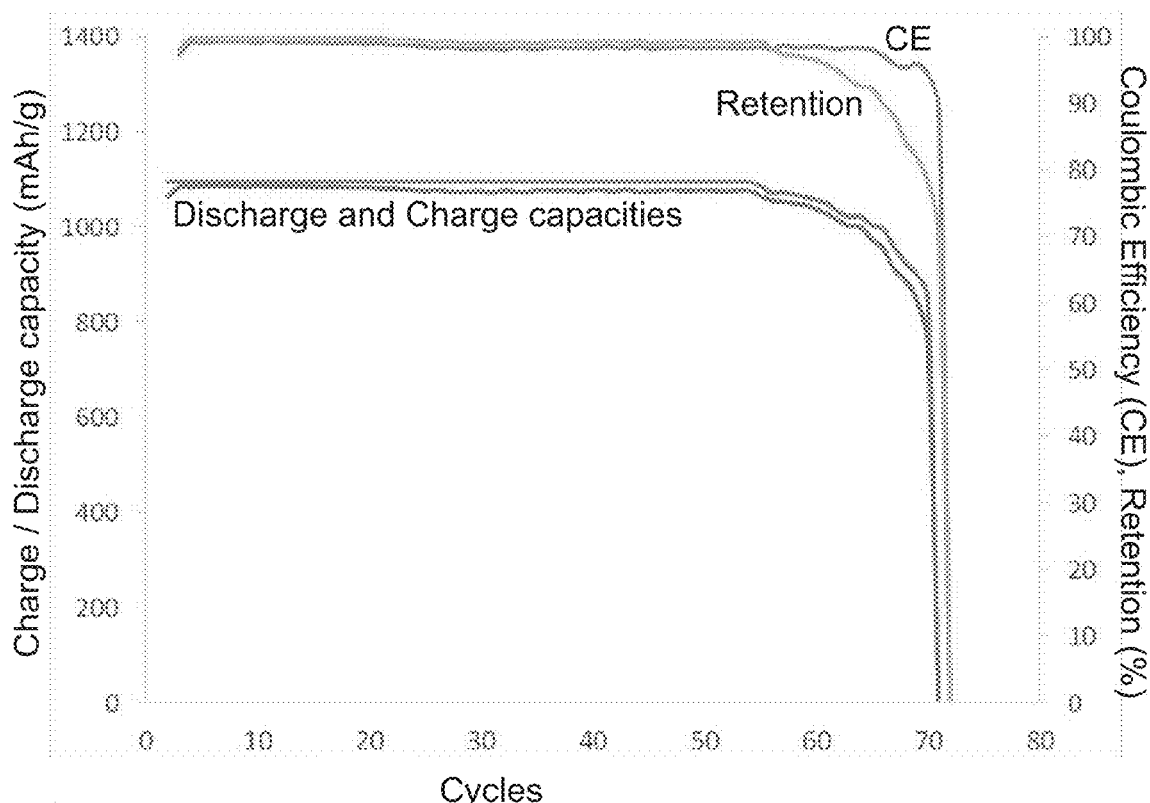
Figure 10D:
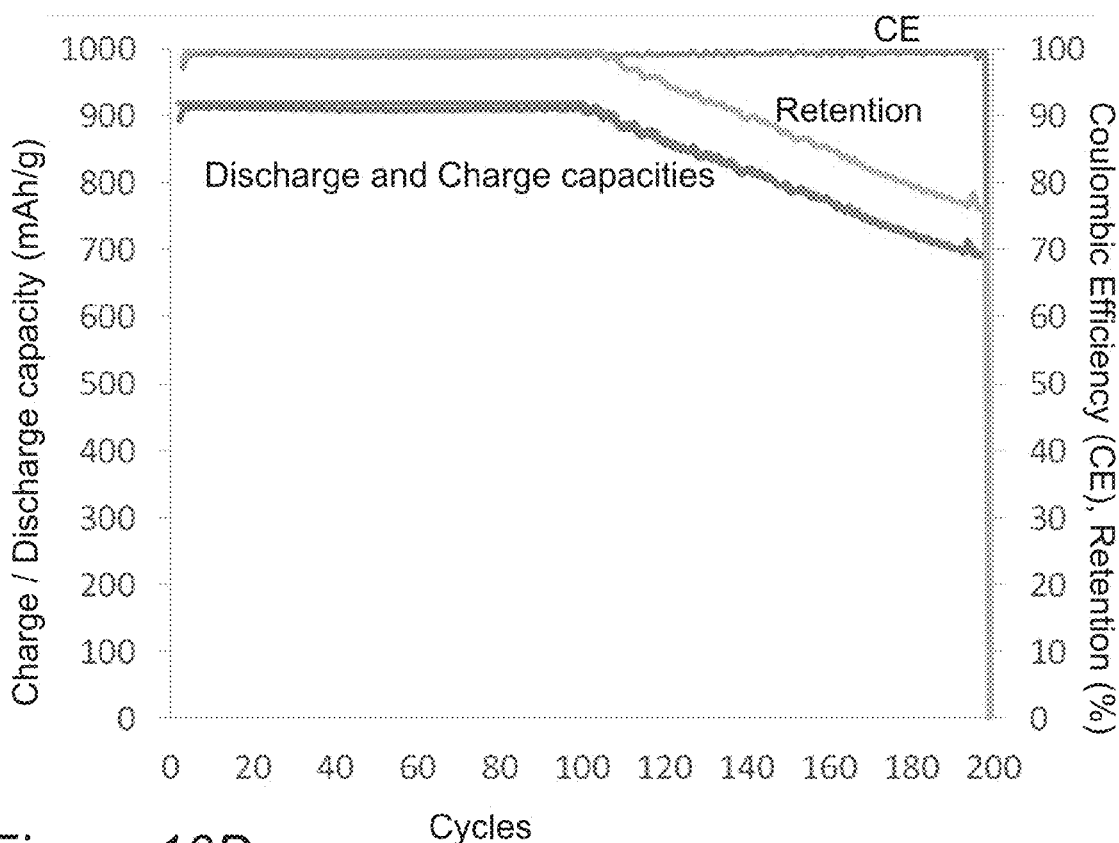

FIGS. 10C and 10D provide data of anode performance for disclosed anode preparation processes, with $SbCl_2$ and $CuCl_2$, respectively, as metalloid salt NPs in half cell configurations, according to some embodiments of the invention.

Figure 10E:
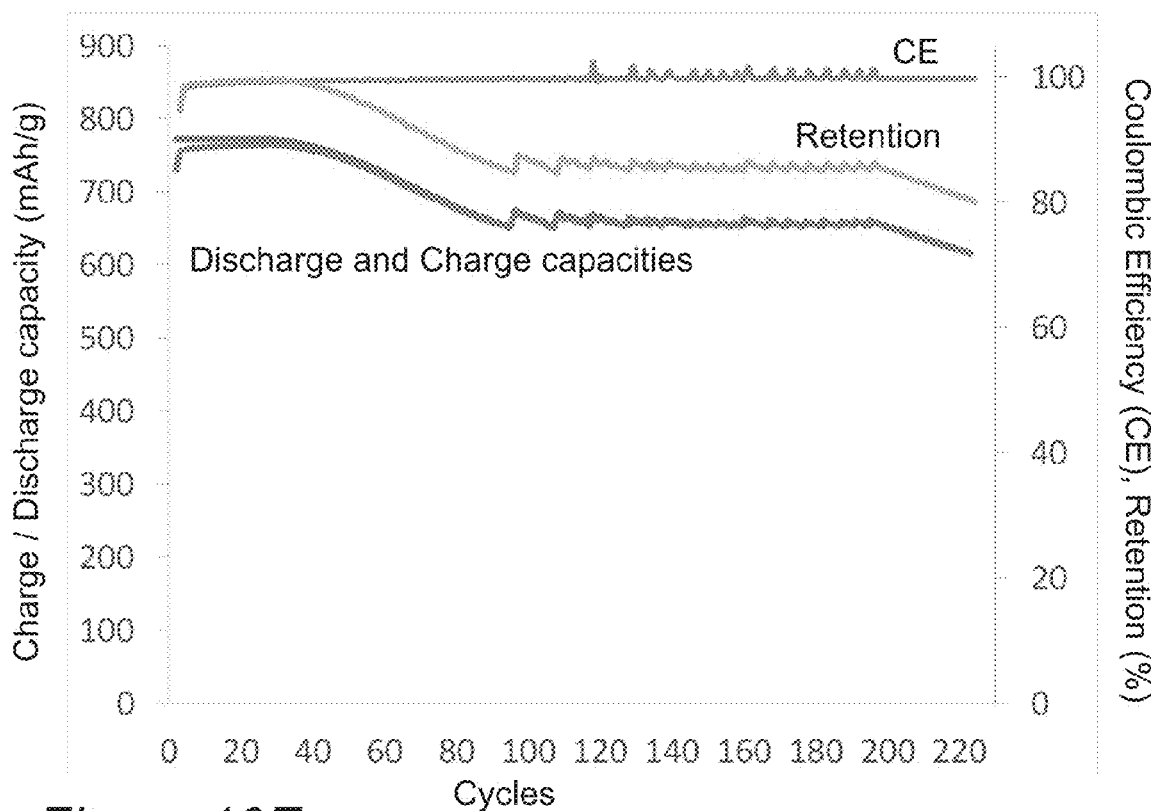
Figure 10F:
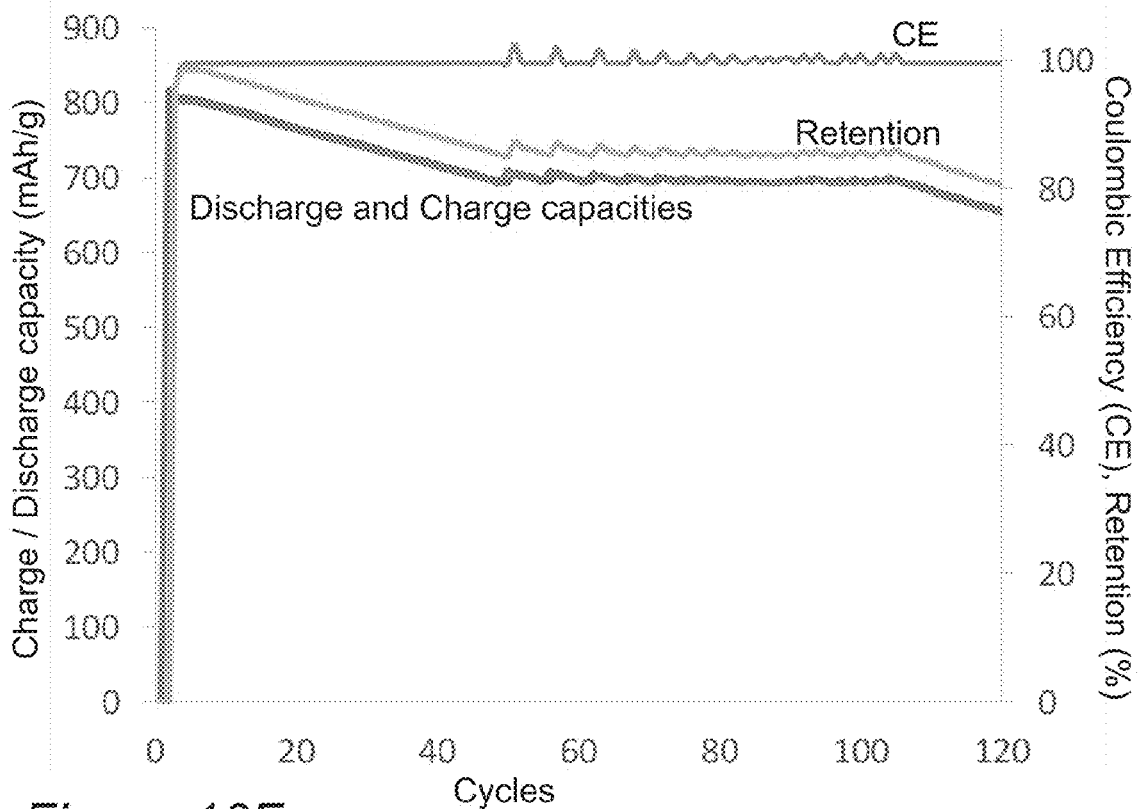

FIGS. 10E and 10F provide data of anode performance for disclosed anode preparation processes, with $SnCl_2$ and $CuCl_2$, respectively, as metalloid salt NPs in full cell configurations, according to some embodiments of the invention.

Figure 11A:
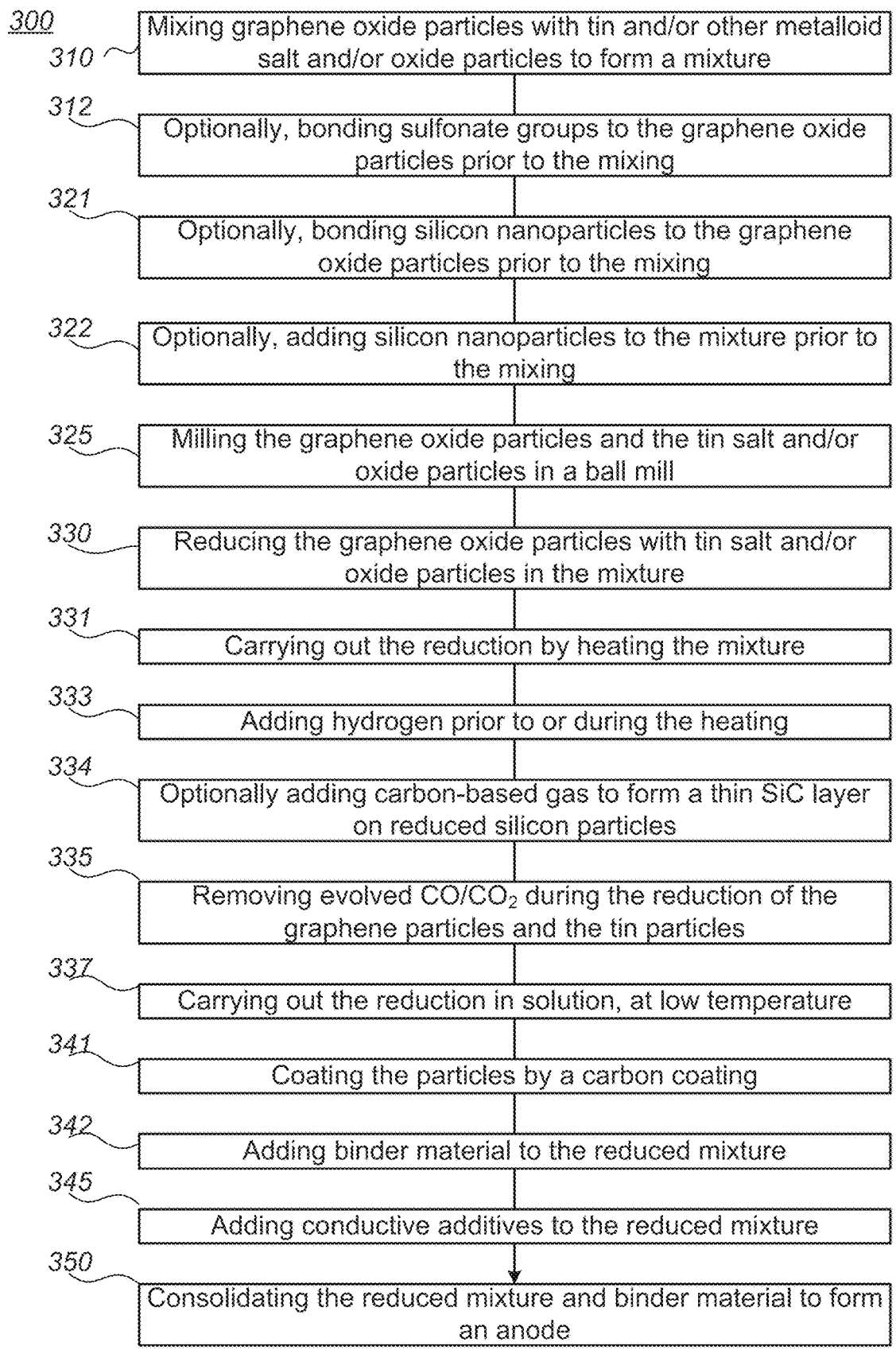

FIG. 11A is a high-level flowchart illustrating a method of preparing an anode for a Li-ion battery, according to some embodiments of the invention.

Figure 11B:
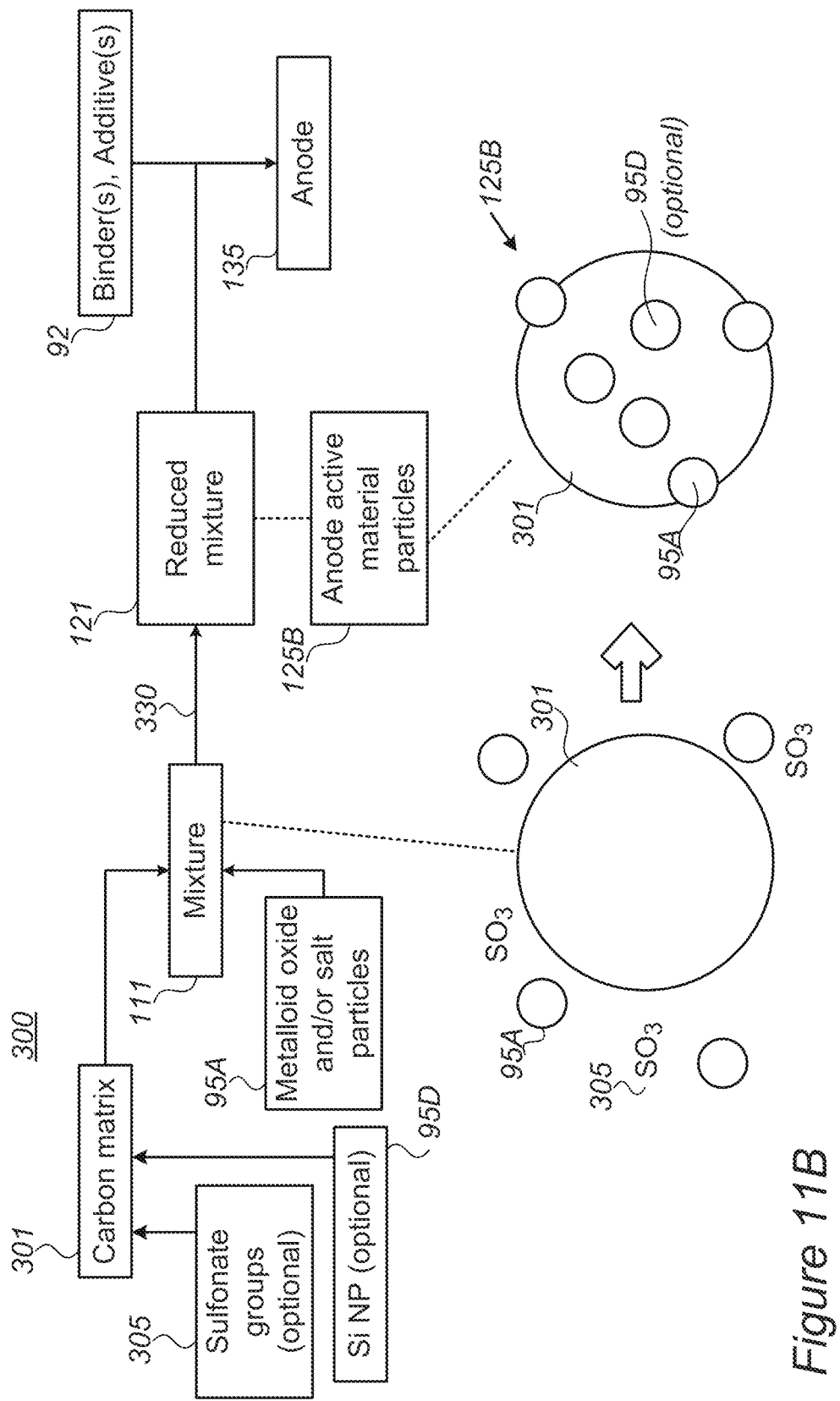

FIG. 11B is a high-level schematic illustration of anode preparation methods and production steps using carbon-based anode active material, according to some embodiments of the invention.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanism for preparing lithium ion batteries and anodes therefor and thereby provide improvements to the technological field of energy storage. Methods of preparing Si-based anode slurries and anode made thereof are provided. Methods comprise coating silicon particles within a size range of 300-700 nm by silver and/or tin particles within a size range of 20-500 nm, mixing the coated silicon particles with conductive additives and a binder in a solvent to form an anode slurry, and preparing an anode from the anode slurry. Alternatively or complementarily, silicon particles may be milled in an organic solvent, and, in the same organic solvent, coating agent(s), conductive additive(s) and binder(s) may be added to the milled silicon particles—to form the Si-based anode slurry. Alternatively or complementarily, milled silicon particles may be mixed, in a first organic solvent, with coating agent(s), conductive additive(s) and binder(s)—to form the Si-based anode slurry. Disclosed methods simplify the anode production process and provide equivalent or superior anodes. Additionally, methods, anode material particles, mixtures, anodes and lithium-ion batteries are provided, having passivated silicon-based particles that enable processing in oxidizing environments such as water-based slurries. Methods comprise forming a mixture of silicon particles with nanoparticles (NPs) and carbon-based binders and/or surfactants, wherein the NPs comprise at least one of: metalloid oxide NPs, metalloid salt NPs and carbon NPs, reducing the mixture to yield a reduced mixture comprising coated silicon particles having a passivation coating providing a passivation layer (possibly amorphous), and consolidating the reduced mixture to form an anode. It is suggested that the NPs provide nucleation sites for the passivation layer on the surface of the silicon particles—enabling significant anode-formation process simplifications such as using water-based slurries—enabled by disclosed methods and anode active material particles.

Figure 1:
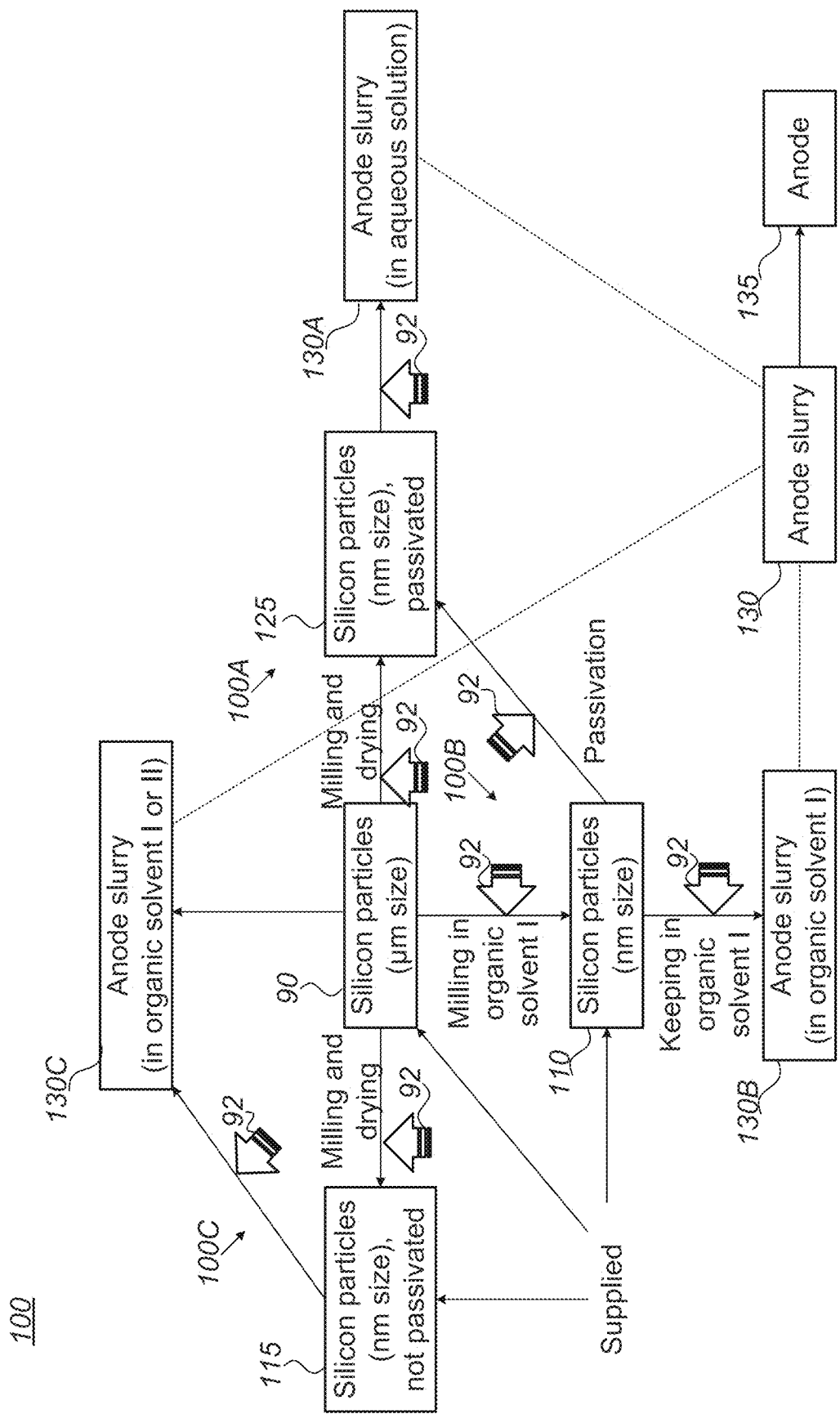

FIGS. 1 and 6 are high-level schematic illustrations of a method 100 of preparing a Si-based anode slurry 130 to form anodes 135, according to some embodiments of the invention. FIG. 1 illustrates in a schematic manner approaches 100A, 100B, 100C, disclosed in more detail below, for preparing anode slurries, and include multiple related embodiments. All of the disclosed approaches prevent the consequences of silicon reactivity towards water-based solvents that are used in the prior art, and yield anodes 135 with higher performance rates compared to anodes from prior art processes in which the silicon active material particles react with the water-based solvent of the anode slurry, and/or with oxygen and/or water during prior art slurry preparation stages.

Various types of silicon may be used as starting material, such as supplied μm-size silicon particles 90 and/or supplied nm-size silicon particles 110.

In certain embodiments (approach 100A), μm-size silicon particles 90 may be milled and dried to form passivated nm-size silicon particles 125 and/or supplied nm-size silicon particles 110 may be passivated to form passivated nm-size silicon particles 125 (e.g., using processes disclosed herein such as reducing silicon mixtures with oxides or salts, and/or coating by silver nanoparticles)—to enable using passivated nm-size silicon particles 125 in water-based anode slurries 130A without active material degradation due to silicon reactivity.

In certain embodiments (approach 100B), μm-size silicon particles 90 may be milled in an organic solvent to form nm-size silicon particles 110 and keeping (possibly supplied) nm-size silicon particles 110 in the organic solvent to form organic-solvent-based anode slurry 130B—preventing active material degradation due to silicon reactivity.

In certain embodiments (approach 100C), μm-size silicon particles 90 may be milled in an organic solvent and then dried to form a powder of nm-size silicon particles 115 which are not passivated (but protected during the milling by the organic solvent). Powder 115 (and/or supplied nm-size silicon particles 110) may be further processed in an organic solvent, which may comprise the same solvent as the one in which the μm-size silicon particles 90 were milled, or comprise a different organic solvent (denoted organic solvent I and II, respectively)—to form organic-solvent-based anode slurry 130C while preventing active material degradation due to silicon reactivity.

In certain embodiments, μm-size silicon particles 90 may be used to directly form anode slurry 130C. In certain embodiments, μm-size silicon particles 90 may be passivated by any of the disclosed methods.

In any of the embodiments, various additives 92 may be added in different milling, passivation and/or slurry preparation stages (denoted schematically by broad arrows, which are optional in any of the process stages). Examples for additives 92 comprise any of additional active materials (e.g., Sn, Ge, graphite and/or other carbon-containing materials), conductive additive(s), binder(s) and/or filler(s). Specific, non-limiting examples for additive materials and process stages in which they are added are provided below.

In certain embodiments, passivation of anode active material may be carried out using silver (Ag) and/or tin (Sn) nanoparticles (20-500 nm, or possibly any of 20-300 nm, 20-100 nm, 20-50 nm or any other subrange) to stabilize nm-size silicon particles 110 and yield passivated nm-size silicon particles 125 that can be used in water-based anode slurry 130A and/or slurries 130A having protonated solvents and/or polar non-protic solvents—to form anode 135. Clearly, Ag/Sn-coated nm-size silicon particles 125 may also be used in anode slurries based on organic solvents 130B, 130C. It is noted that the passivation of the active material is carried out by the coating with silver and/or tin nanoparticles within passivation processes that may include milling and/or heating and addition of graphite and/or carbon, as disclosed herein.

The silver/tin nanoparticles may be mixed rigorously with the silicon particles and possibly heated—to prevent complex coating and yield non-agglomerated, homogenously coated Si particles. The mixing may be carried out by dry and/or wet ball milling. In an example dry ball milling was carried out for six hours, milling Si with Ag and/or Sn, particles, followed by additional six hours dry milling with graphite in a high energy ball milling process, at 300 RPM. Wet ball milling was carried out with Sn particles, at ca. 1300 RPM in wet grinding processes with agitator bead mills, for 1-6 hours in butanol or in dipropylene glycol methyl ether. Disclosed Ag/Sn-based passivation by coating the active materials with Ag and/or Sn nanoparticles—may be applied to anodes with a high percentage of Si active material, e.g., in a range between 20 wt % and 60 wt %, 70 wt % or 80 wt % of Si in the anode. The silicon particles may have diameters between 100-500 nm, between 300-700 nm, between 100-800 nm or between 100-1200 nm.

Advantageously, passivation processes that include coating by silver/tin nanoparticles increase the anode conductivity, improve the fast charging performance and extends cycling lifetime. Moreover, after coating and drying, anodes 135 with Ag/Sn-based passivated nm-size silicon particles 125 also exhibit higher conductivity than the conductivity of anodes with silicon and carbon without the Ag coating, resulting in high performance in fast charging batteries even at high loads and at a high energy density. For example, Ag- and/or Sn-based passivation increase the electrode conductivity (measured on the anode electrode by a four point probe) by about an order of magnitude (e.g., about 100 S/m$^2$ for Si particles with Sn or Ag coating versus about 10 S/m$^2$ for similar electrodes with Si particles without coating).

Table 1 provides examples for formulations of anode material and slurry compositions with Ag-coated Si anode material particles.

All formulations yielded cell energy density of ca. 175 Wh/kg and were operated at 6 C charging rates and 1 C discharging rates. It is noted that some of the formulations utilize butanol solvent for passivation of the Si, as disclosed herein. The formulations with smaller Ag nanoparticles (1, 2, 3) exhibited longer cycling lifetime with respect to the formulations with larger Ag nanoparticles (4, 5), by ca. 50% (for formulations 1 and 2) and 60% (for formulation 3), possibly due to the smaller size of the Ag particles.

FIGS. 2A and 2B provide a SEM (Scanning electron microscope) image and EDS (Energy-dispersive X-ray spectroscopy) analysis, respectively, showing nano silver particles in a relatively uniform coating layer on the anode, according to some embodiments of the invention.

Advantageously, disclosed embodiments both reduce silicon reactivity in water and increase silicon conductivity, improving production methods and performance of disclosed anodes 135. These improvements enable providing lithium-ion batteries which are fast charging and have both high power density and high energy density, utilizing the achieved high capacity anodes 135 having relatively low coating weight.

Referring to FIG. 6, method 100 may comprise coating silicon particles within a size range of between 100-500 nm, between 300-700 nm, between 100-800 nm or between 100-1200 nm—by silver and/or tin particles within a size range of 20-70 nm (stage 270), mixing the coated silicon particles with conductive additives and binders in a solvent to form an anode slurry (stage 260), and preparing an anode from the anode slurry (stage 265). Coating 270 may be carried out by mixing, e.g., by dry and/or wet ball milling. The solvent may be any of water-based solvent, protonated solvent, and/or polar non-protic solvent; or possibly organic solvent as disclosed below.

FIG. 3 is a high-level schematic illustration of a method 100 of preparing a Si-based anode slurry 130, according to some embodiments of the invention. Method 100 provides a continuous process for milling micron-size silicon 90 to nano-size silicon 110 in an organic solvent 120 (e.g., butanol), in which silicon is non-reactive. Advantageously with respect to the prior art, method 100 prevents prior art hydrogen formation and surface oxidation that result from milling the silicon in water. After the milling, coating agent(s), conductive additive(s) and binder(s) 92 may be added, using the same solvent 120, to form an anode slurry 130.

For example, preparing an anode from silicon-based anode slurry 130 with butanol as organic solvent 120, to be used in fast-charging lithium-ion cells with NMC cathodes, micron-size Si 90 was milled to 300 nm in butanol (in high

TABLE 1

Anode compositions.

| Component | Formulation | | | | |
|---|---|---|---|---|---|
| | 1 | 2 | 3 | 4 | 5 |
| Si particle size (nm) | 300 | 300 | 700 | 300 | 300 |
| Ag particle size (nm) | 20 | 20 | 20 | 70 | 70 |
| Si (wt %) | 42.60% | 42.60% | 42.60% | 42.60% | 42.60% |
| Ag (wt %) | 5.40% | 5.40% | 5.40% | 5.40% | 5.40% |
| Graphite (wt %) | 12% | 12% | 12% | 12% | 12% |
| Conductive carbon (wt %) | 20% | 20% | 25% | 20% | 20% |
| PAA-based binder (wt %) | 20% | 20% | 15% | 20% | 20% |
| Solvent | Water | Butanol | Water | Water | Butanol | rpm) to thus form nano-size Si 110. Then, nano-size Sn particles and graphite 92 were added and mixed (in lower rpm) to form active material in butanol. Then, conductive additives (e.g., SC65, Cabot 200E, Cabot 200D) and binders (PAA 450 kD: citric acid, 9:1) 92 were added to the mixture to form final slurry 130 in butanol.

In various embodiments, solvent 120 may comprise any of butanol, dipropylene glycol methyl ether (DPM), NMP (N-methyl-2-pyrrolidone), DMF (dimethylformamide), ethanol, propanol, pentanol, hexanol and/or cyclohexanol. FIGS. 5A and 5B below illustrate a reactivity test of silicon slurry in butanol compared with and silicon slurry in water.

Referring to FIG. 6, method 100 may comprise preparing a Si-based anode slurry (stage 205), by milling silicon particles in an organic solvent to yield milled silicon particles (stage 210), and in the same organic solvent, adding to the milled silicon particles at least one coating agent, at least one conductive additive and at least one binder—to form the Si-based anode slurry (stage 220). In certain embodiments, micron-size silicon particles 90 may have diameters between 1-30 µm and milled silicon particles 110 may have diameters between 100-500 nm, between 100-800 nm or between 100-1200 nm. Method 100 may further comprise adding tin particles to the same organic solvent (stage 222). For example, the tin particles may have diameters between 100-500 nm or between 20-700 nm. The conductive additive(s) may comprise carbon, the coating agent(s) may comprise graphite, and the binder(s) may comprise PAA.

FIG. 4 is a high-level schematic illustration of method 100 of preparing a Si-based anode slurry 130, according to some embodiments of the invention. Method 100 provides a process for milling silicon micron-size particles 90, in which, in a first step, silicon nanoparticles 110 are provided, for example, by milling silicon particles 90 with optionally a coating additive 92A in a first organic solvent 120 (e.g., butanol), followed by a second step of removing first organic solvent 120 (e.g., by oven drying) to provide a dry silicon mixture 125, and then, adding to dry silicon mixture 125 conductive additive(s) and binder(s) 92B in a second solvent 140 that may comprise any of the same first organic solvent (e.g., butanol), a different second organic solvent, or water-based aqueous solvent (e.g., when silicon nanoparticles 110 in dry silicon mixture 125 are passivated, e.g., by coating agent(s) and/or additional processes, as disclosed herein)—to provide anode slurry 130.

It is noted that Si particles of any size, milled or un-milled, may be mixed with conductive additive(s) and binder(s) 92 in organic solvent 120, which decreases or prevents Si reactivity (as no water is available in the solvent)—to provide slurry 130 for preparing of anode electrodes 135. Alternatively or complementarily, Si particles of any size may be pre-mixed with additive(s) such as conductive additive(s) and/or coating additive(s) 92A to prepare active material—to protect or passivate the Si particles. The protected or passivated active material may then be mixed with conductive additive(s) and binder(s) 92B in organic solvent or in water-based solvent 140—to provide slurry 130 for preparing anode electrodes.

FIGS. 5A and 5B provide images of reactivity experiments of anode slurries enclosed in pouches, comparing protected Si anode material in butanol, according to some embodiments of the invention, with unprotected Si anode material in water. The lack of reactions between the Si and butanol in FIG. 5A is illustrates by the flat-remaining pouch, in contrast to the swollen pouch of FIG. 5B that results from gas production due to the chemical reaction between the Si and the water.

For example, preparing an anode from silicon-based anode slurry 130 with butanol as organic solvent 120, to be used in fast-charging lithium-ion cells with NMC cathodes, micron-size Si 90 was milled to 300 nm in butanol (in high rpm) to thus form nano-size Si 110 and then dried to remove the butanol. Then, nano-size Si particles 110 were ball-milled with nano-Sn particles and graphite (KS6L) 92B for 12 h to form the active material. Then, conductive additive (SC65) and binder (PAA 450 kD: citric acid, 9:1, 7.5% in butanol) 92 were added to the mixture to form final slurry 130.

In another example for preparing an anode from silicon-based anode slurry 130 with butanol as organic solvent 120, to be used in fast-charging lithium-ion cells with NMC cathodes: provided nano-size Si particles 110 were ball-milled with nano-Sn particles and graphite (KS6L) 92B for 12 h to form the active material. Then, the formed active material was mixed with butanol 140 and conductive additive (SC65) and binder (PAA 450 kD: citric acid, 9:1) 92 were added to the mixture to form final slurry 130.

In yet another example for preparing an anode from silicon-based anode slurry 130 with water as the solvent (and/or with protonated solvents and/or with polar non-protic solvents), to be used in fast-charging lithium-ion cells with NMC cathodes: micron-size Si 90 was milled to 300 nm in butanol to form nano-size Si 110 and then mixed with coating agents comprising tin particles (e.g., $SnCl_2$), PVP (polyvinylpyrrolidone) binder, and conductive additive (SC65) in ethanol (or possibly butanol). The mixture was then dried to remove the butanol, and the crude product was annealed at 700° C. for 15 min in a furnace oven. The final active material was mixed in water 140, and conductive additive (SC65) and binder (LiPAA) were added to form final slurry 130. It is noted that any of the following may be used as solvent: butanol, dipropylene glycol methyl ether (DPM), NMP (N-methyl-2-pyrrolidone), DMF (dimethylformamide), ethanol, propanol, pentanol, hexanol and/or cyclohexanol.

In still another example for preparing an anode from silicon-based anode slurry 130 with water as the solvent (and/or with protonated solvents and/or with polar non-protic solvents), to be used in fast-charging lithium-ion cells with NMC cathodes: provided nano-size Si particles 110 were mixed in butanol and then coating agents comprising tin particles (e.g., $SnCl_2$), PVP (polyvinylpyrrolidone) binder, and conductive additive (SC65) were added. The mixture was then dried to remove the butanol, and the crude product was annealed at 700° C. for 15 min in a furnace oven. The final active material was mixed in water 140, and conductive additive and binder (LiPAA) were added to form final slurry 130.

In all examples presented above, stable anodes having high electrochemical performance were formed in contrast to a prior art process of mixing uncoated nano-Si in water and then adding conductive additives and binders. This prior art process results in aggressive hydrogen formation, and low electrochemical performance of the electrodes produced by prior art procedures. Moreover, it was further shown that the cycling lifetime for batteries with anodes formed by the disclosed processes in organic solvents was similar to the cycling lifetime for batteries produced with prior art methods in water-based solvents. Hence, disclosed processes perform at least as well as prior art processes, and provide further benefits of simpler anode processing. In several experiments, batteries included Si-based anodes with ca. 50% Si active material and anode loads of about 2 mg/cm$^2$, and similar amounts of binder and conductive additives.

Experiments were conducted on full cells, with NMC-based cathodes having cathode loads of about 14 mg/cm², resulting in Cathode to Anode (C/A) ratio of about 0.9. The cells were cycled at 6 C charging rates and 1 C discharging rates, under the same working potential window. The resulting cycling lifetime for batteries having anodes prepared from butanol-based anode slurries (approaches 100B, 100C, referring to FIG. 1) was within ±10% of the cycling lifetimes for batteries with anodes prepared according to prior art, with water-based slurries.

Referring to FIG. 6, method 100 may comprise preparing a Si-based anode slurry (stage 205), by mixing milled silicon particles, in a first organic solvent, with at least one coating agent, at least one conductive additive and at least one binder—to form the Si-based anode slurry (stage 260). In various embodiments, the milled silicon particles may be dried from a milling process in a second organic solvent (stage 230). The second organic solvent may comprise any of butanol, dipropylene glycol methyl ether and/or NMP and may be the same as (or different from) the first organic solvent. The milled silicon particles may have diameters between 100-500 nm, between 100-800 nm or between 100-1200 nm. In various embodiments, method 100 may further comprise pre-mixing the milled silicon particles with at least one coating agent and/or at least one conductive additive (stage 240), possibly to passivate the milled silicon particles. In various embodiments, the milled silicon particles may be passivated prior to the mixing (stage 250). Method 100 may further comprise adding tin particles to the same organic solvent (stage 222). For example, the tin particles may have diameters between 100-500 nm or between 20-700 nm. The conductive additive(s) may comprise carbon, the coating agent(s) may comprise graphite, and the binder(s) may comprise PAA.

FIG. 7 is a high-level schematic flowchart illustrating a method 100, according to some embodiments of the invention. Method 100 may comprise any of the stages disclosed above, as well as any of the following stages, irrespective of their order. Method 100 comprises forming a mixture of silicon particles with nanoparticles (NPs) and a carbon-based binder and/or surfactant (stage 240, and see also FIG. 6 above), wherein the NPs comprise at least one of: metalloid oxide NPs, metalloid salt NPs (stage 242) and carbon NPs (stage 244), reducing the formed mixture to yield coated silicon particles respective passivation coating layer(s) that may be amorphous (stage 280, see also stage 250 in FIG. 6), and consolidating the reduced mixture to form an anode (stage 286, see also stage 265 in FIG. 6). Advantageously, the reduced mixture may be used in a water-based slurry, possibly in an oxygen-containing atmosphere, to form the anode (stage 288), with the passivation coating preventing oxidation of the silicon particles in the water-based slurry (stage 282), acting as a passivation layer. Disclosed passivation may be used in approach 100A and respective anode slurry 130A in FIG. 1, in place or in addition to disclosed passivation method, e.g., in addition to the disclosed passivation using silver nanoparticles. It is noted that the formation of the passivation layer on the silicon particles, which enables their processing in a water-based slurry, is surprising and was not expected. Without being bound by theory, it is suggested that the NPs may provide nucleation sites for forming the passivation layer coating on the silicon particles (possibly from carbon in the binder and/or surfactant), which is stable and thick enough (e.g., between 5-20 nm thick) to prevent oxidization of the silicon particles during anode preparation—simplifying significantly the anode preparation process. Non-limiting examples for the NPs comprise any of tin oxide (SnO, $SnO_2$) NPs, tin salt (e.g., $SnCl_2$) NPs, carbon (e.g., SC65) NPs, $SbCl_2$ or other antimony (Sb) salts NPs, $CuCl_2$ or other copper salts NPs, Sn, Sb, Cu, SnSb alloy and/or SnCu alloy NPs, as well as NPs of antimony and/or tin alloys such as comprising at least one of Fe, Cu and Co alloys of Sn and/or Sb. In various embodiments, the NPs may be metallic, and not reduced in the process, and possibly comprise other materials such as Ag, Au, Pb, Ge.

Forming the mixture (stage 240) may be carried out by mixing, e.g., with magnetic stirrer or sonication. Reducing the mixture (stage 280) may be carried out in a tube furnace and evolving gases such as CO and/or $CO_2$ may be removed from the container during the reduction. In certain embodiments, reducing 280 may be carried out in solution with a reducing agent. e.g., sodium borohydride, at a temperature below 200° C.

In various embodiments, the NPs may provide 0.1%-30% (w/w) or possibly up to 50% of the dry material in the mixture. In various embodiments, the silicon particles may provide up to 90% (w/w) of the mixture. In various embodiments, the carbon-based binder and/or surfactant may comprise PVP (polyvinylpyrrolidone). In certain embodiments, the carbon-based binder and/or surfactant may comprise PAA (poly(acrylic acid)) or Li-PAA, and/or any of PVDF (polyvinylidene difluoride), CMC (carboxymethyl cellulose), polypyrrole, PEDOT-PSS (poly (3,4-ethylene dioxythiophene):poly (styrene sulfonate)), polyaniline, polyethylene oxide, polyvinyl acetate, polyvinyl alcohol, citric acid/citrate salt, cetrimonium bromide, and their respective derivatives, combinations and/or equivalent carbon-based binders and/or surfactant.

In certain embodiments, reducing 280 may be carried out by heating the mixture at a temperature in a range of 700° C. or 800° C. to 1000° C.

It is noted that using silicon particles in carbothermal reduction requires high temperatures which may not be feasible or practical in the context of anode material production. Without being bound by theory, the coating may comprise a very thin silicon carbide coating that may be produced at temperatures that are lower than required for Si reduction. For example, the very thin SiC layer may be 0.1-3 nm thick, and may be formed at temperatures as low as 1000° C., or even at temperatures as low as 700° C. or 800° C. In certain embodiments, reduction 280 may be carried out in the presence of an inert gas (stage 284), which may be part of the atmosphere in which the particles are heated. In certain embodiments, reduction 280 may be carried out in the presence of a carbon-based gas, to complement the carbon-based binder and/or surfactant if needed. Advantageously, the SiC layer may reduce Si reactivity—yielding passivation, that may enable processing anode active material particles into anode in an environment that does not completely exclude water or oxygen, simplifying the production processes.

FIG. 8 is a high-level schematic illustration of method 100 and materials forming anode active materials 125 and anode 135, according to some embodiments of the invention.

Certain embodiments comprise a mixture 121 of anode material particles 125A comprising silicon particles 90A having carbon passivation layers 123 (possibly amorphous) that are non-reactive in an oxidizing environment. Certain embodiments comprise anodes 135 for fast charging lithium ion batteries, which comprise mixture 121 of anode material particles 125A, consolidated with binder and conductive materials 92 from a water-based slurry.

Certain embodiments comprise anodes 135 for fast charging lithium ion batteries, which comprise reduced mixture 121 of silicon particles 90 having passivation layers 123 (possibly carbon-based, possibly amorphous), consolidated with binder and conductive materials 92 from a water-based slurry to form anode 135, wherein mixture 121 is reduced from a mixture 111 of silicon particles 90A with nanoparticles (NPs) 95 such as metalloid oxide and/or salt NPs 95A (e.g., any of SnO, $SnO_2$, $SnCl_2$), salt NPs 95B (e.g., $SbCl_2$ or other antimony salts, $CuCl_2$ or other copper salts, as well as antimony and/or tin alloys) and/or carbon NPs 95C (e.g., carbon black, SC65), and a carbon-based binder and/or surfactant 85 (e.g., PVP or any other carbon-based binder/surfactant, e.g., as listed above).

In certain embodiments, NPs 95 may comprise 10-15 nm, 10-50 nm and/or 10-100 nm tin oxide and/or salt NPs 95A. In certain embodiments, NPs 95 may provide 0.1%-30% (w/w) of mixture 111 or possibly up to 50% of the dry weight of the mixture. In certain embodiments, silicon particles 90A may be 100-500 nm and/or 100-1000 nm in diameter, and may provide up to 90% of the mixture. In certain embodiments, the thickness of coating 123 may be any of: 1 nm-5 nm, 5 nm-10 nm, 1 nm-10 nm, 5-20 nm, 10-20 nm, 20 nm-30 nm, 20-50 nm, 20 nm-100 nm, 50 nm-100 nm, or any partial range or combination of ranges. Coating 123 may be at least partly carbon-based, or fully carbon-based. For example, coating 123 may comprise amorphous and/or crystalline carbon. In certain embodiments, coating 123 may comprise a 0.1-3 nm thick SiC layer. In various embodiments, coating 123 may comprise at least partly any of: $Al_2O_3$, $SiO_2$, $TiO_2$, LTO (lithium titanate), MgO and/or $ZrO_2$, which may provide passivation components, e.g., as products of calcination in air.

FIGS. 9A-9C provide experimental indications for characteristics and advantages of disclosed methods 100 and anode active material particles 125A, according to some embodiments of the invention. FIG. 9A illustrates the non-reactivity of anode active material particles 125A with respect to the reactivity of prior art silicon-based anode active material particles 70A, 70B; FIG. 9B illustrates the decoration of silicon particles 90A by Sn NPs 95A; and FIG. 9C illustrates passivation coating 123 as amorphous coating 123, as explained below.

FIG. 9A provides an experimental indication of the passivation of active material particles 125A based on silicon particles 90A, which is achieved by disclosed methods 100, according to some embodiments of the invention. Slurries were prepared from three types of anode material particles, namely—passivated particles 125A decorated with Sn NPs 95A, ball-milled silicon particles with native oxide layers and Sn 70A and ball-milled silicon particles with removed (and regrown) oxide layers and Sn 70B. The slurries were sealed within pouches and examined for reactivity according to hydrogen production upon reaction with the water in the slurry—causing inflation of the pouches in case of reactivity. After seven days in ambient conditions, only the pouch containing disclosed, passivated, anode material particles 125A did not expand. Moreover, FIG. 9A shows the pouches that were placed for two hours in 80° C. oven, to expedite the reaction, with similar results—only the pouch containing disclosed, passivated, anode material particles 125A did not expand. The non-reactive pouch was left in the 80° C. oven for additional two weeks, and still did not show any expansion—illustrating the passivation of silicon particles due to amorphous coating 123. Without being bound by theory, it is suggested that passivation, possibly amorphous coating 123 prevented reactions between water or oxygen with the silicon, while prior art native oxide layers (70A) and re-grown oxide layers (70B) on the silicon particles did not reduce silicon reactivity. Advantageously, disclosed passivation simplifies the anode production processes significantly.

For comparison, the effect of using ethanol-based slurry instead of water-based slurry on the reactivity of Si was tested Similar pouches were prepared, with the respective active material particles in ethanol-based slurry (the binder that was used in the ethanol-based slurry was polyacrylic acid, PAA, while the binder that was used in the water-based slurry for the pouches described above was Li-polyacrylate (the conjugate base of PAA), as the latter does not dissolve in ethanol), neither of which swelled after two months at 55° C. Pouches that were stored at 80° C. did expand, due to evaporation of the ethanol. Once removed from the furnace the pouches shrank back as they cooled, indicating that the expansion was not due to gas production in the irreversible chemical reaction, as seen for silicon in water-based slurries.

Certain embodiments comprise anode material particles slurries which are based on organic solvents, such as ethanol, butanol, propylene glycol, methyl ether or other organic solvents that reduce or prevent the reactivity of the anode material particles such as silicon particles. When using slurries with organic solvents, certain embodiments comprise silicon anode material particles which may be only partly or not necessarily passivated, as the organic solvent may provide additional protection against the material's reactivity, especially when anode preparation processes are carried out at industrial scales.

FIG. 9B provides a TEM (transmission electron microscopy) image showing the presence of metallic Sn NPs (nanoparticles) in the synthesis product, according to some embodiments of the invention. Materials used in preparing active particles 125A were Si powder, PVP 40,000 (Polyvinylpyrrolidone with average molecular weight of 40,000), $SnCl_2.2H_2O$ and SuperC 65 (conductive carbon black, SC65). The preparation of the anode material particles was carried out by mixing 5 gr of Si, 1 gr of PVP, 1 gr of $SnCl_2$ and 0.5 gr of SC65 with 100 ml of ethanol anhydrous, mixed well in a glass beaker, manually with a spatula, followed by probe sonication (½ inch probe, 10 min, using 80% amplitude with 7 sec on pulse, and 5 sec off pulse), while the beaker was immersed in an ice bath. After the sonication, the mixture was inserted into the oven overnight in 80° C. for drying. The dried material was crushed into powder using ball milling and magnetic stirring. The powder was then loaded into a quartz boat and inserted into a tube furnace. The furnace was purged with Ar and then heated to 700° C. at a ramp of 10° C. for a minute, and held at that temperature for 15 minutes. Finally, the furnace was cooled to room temperature under Ar flow.

XRD (X-ray diffraction) characterization showed the presence of metallic Sn in the synthesis product. Specifically, results were of 89.4% Si, 8.6% amorphous carbon, 1.2% Moissanite (a silicon carbide, SiC) and 0.8% Sn. The presence of metallic Sn NPs was based on FFT (fast Fourier transform) analysis (right-most images) of fringes indicated in FIG. 9B by the enlarged square, and which correspond to the expected Sn lattice spacing.

FIG. 9C provides a TEM image that illustrates the presence of amorphous coating 123 on particles 125A as one of the synthesis products. Based on the amorphous nature of the coating, the low contrast, and the thickness (too thick to be native oxide on silicon) it is concluded that it is the product of the carbonization and functions as the passivation layer that replaces the natural oxide layer on the silicon particles and allows further processing of silicon-based anode material particles 125A in an environment that may include water and/or oxygen.

Additional experimentation has shown that either tin-based or carbon-black-based NPs 95 were sufficient to form amorphous layer 123 as one or more passivation layer(s) on the silicon particles in the presence of the PVP as binder/surfactant, but when PVP was used without NPs 95, resulting anode material particles were reactive.

Additional experiments were performed to verify that cell performance was not reduced by amorphous coating 123 on anode material particles.

FIGS. 10A and 10B provide a comparison of anode performance for disclosed anode preparation processes, with and without addition of Sn NP, respectively, according to some embodiments of the invention. FIG. 10A illustrates results for coin cells with anodes 135 prepared from passivated silicon-based active material particles 125A (using a water-based slurry), and FIG. 10B illustrates results for similar coin cells with passivated anodes 135, which however lack the addition of Sn NP, and using a water-based slurry. The inventors note that both cases provide scalable processes of working with silicon, whereas addition of Sn also increases the cycling lifetime and performance. FIGS. 10A and 10B illustrate that the disclosed passivation of the silicon particles enables using water-based slurries in the preparation of the anodes, without reduction in performance. It is noted that non-reactivity in a water-based slurry is an enabling property for upscaling lithium-ion battery production.

FIGS. 10C and 10D provide data of anode performance for disclosed anode preparation processes, with $SbCl_2$ and $CuCl_2$, respectively, as metalloid salt NPs 95A in half cell configurations, according to some embodiments of the invention. The cells were prepared as coin cells and the charging rate was 1 C. The retention was measured from the fourth cycle (following formation). FIGS. 10C and 10D illustrate the possibility of using $SbCl_2$ and $CuCl_2$ as metalloid salt NPs 95A, as disclosed herein.

FIGS. 10E and 10F provide data of anode performance for disclosed anode preparation processes, with $SnCl_2$ and $CuCl_2$, respectively, as metalloid salt NPs 95A in full cell configurations, according to some embodiments of the invention. The cathodes in the full cells were NMC cathodes (based on a lithium nickel-manganese-cobalt formulation), and the charging rate was 6 C. The retention was measured from 2.53 mAh for $SnCl_2$ and from 2.19 mAh for $CuCl_2$. FIGS. 10E and 10F illustrate the possibility of using $SnCl_2$ and $CuCl_2$ as metalloid salt NPs 95A, as disclosed herein—in full cell configurations and in high charging rate applications.

FIG. 11A is a high-level flowchart illustrating a method 300 of preparing an anode for a Li-ion battery, according to some embodiments of the invention. The stages of method 300 may be carried out in combination with any of the stages of method 100, to enhance or complement the formation of anodes 135 described above. Method 300 may comprise the following stages, irrespective of their order.

As illustrated schematically in FIG. 11A, method 300 may comprise mixing graphene oxide particles and/or other carbon matrix with tin salt and/or oxide particles (e.g., $SnCl_2$, SnO, $SnO_2$ etc.), and/or other metalloid salt and/or oxide particles—to form a mixture (stage 310), for example, the metalloid, e.g., tin salt and/or oxide particles may provide 0.1%-30% (w/w) of the mixture; reducing the graphene oxide particles and the tin salt and/or oxide particles in the mixture (stage 330) (e.g., deoxidizing graphene oxide and possibly tin oxide), e.g., by heating the mixture at a temperature in a range of 200 to 900° C., or possibly at a temperature in a range of 400 to 700° C., to form a reduced mixture (e.g., enhancing or complementing reduced mixture 121); alternatively or complementarily reducing the mixture in solution at low temperatures, stage 337); adding a binder material to the reduced mixture (stage 342); and consolidating the reduced mixture and binder material to form the anode (stage 350).

In various embodiments, the metalloid particles added to the graphene may comprise at least one of: metalloid oxide particles, metalloid salts and metalloid nanocrystals, wherein the metalloid comprises at least one of Sn, Ge and Si.

In certain embodiments, graphene oxide particles may be added to mixture 111 disclosed above to enhance its carbon content, e.g., in place or in addition to carbon black NPs 95C. The tin salt and/or oxide particles may correspondingly be used to complement or at least partly replace salt NPs 95B to enhance the capacity of formed anodes 135.

In some embodiments, method 300 may further comprise bonding sulfonate groups to the graphene particles (stage 312) prior to mixing 310. In some embodiments, method 300 may further comprise bonding silicon nanoparticles to the graphene particles (stage 321) prior to mixing 310, and/or incorporating any of the stages of method 100 disclosed above. In certain embodiments, method 300 may comprise adding silicon nanoparticles to the mixture (stage 322) prior to mixing 310.

In some embodiments, mixing 310 may comprise milling the graphene oxide particles and the tin salt and/or oxide particles in a ball mill (stage 325). In some embodiments, reducing 330 may be carried out in a stainless-steel container holding the mixture during reduction 330 of the graphene oxide particles and the tin salt and/or oxide particles.

In some embodiments, reducing 330 may be carried out by heating the mixture (stage 331), e.g., above 200° C., 400° C., 600° C., 800° C., optionally up to 1000° C., e.g., in an inert atmosphere. In some embodiments, reducing 330 may further comprise adding hydrogen to the inert atmosphere prior to or during the heating (stage 333) and/or optionally adding carbon-based gas to form a thin SiC layer on reduced silicon particles (stage 334). In some embodiments, method 300 may further comprise removing evolved CO and/or $CO_2$ from the container during the reduction of the graphene oxide particles and the tin salt and/or oxide particles (stage 335).

In some embodiments, reducing 330 may be carried out in solution, at low temperatures, e.g., in reducing solution, e.g., comprising sodium borohydride at temperatures below 200° C. (stage 337).

In some embodiments, method 300 may further comprise coating the reduced particles with a carbon coating (stage 341). In some embodiments, method 300 may further comprise adding conductive additives to the reduced mixture (stage 345). Method 300 may comprise preparing the anode from active material particles slurry and additives and preparing corresponding lithium ion cells and batteries from the anode(s), cathode(s), electrolyte(s), separator(s) and corresponding enclosure, contacts and current collectors, control circuits and other cell and battery elements.

FIG. 11B is a high-level schematic illustration of anode preparation methods and production steps 300 using carbon-based anode active material 301, according to some embodiments of the invention. In certain embodiments, methods 300 comprise preparing anodes 135 for lithium-ion batteries by mixing (stage 310) a carbon matrix 301 with metalloid oxide and/or salt particles 95A to form a mixture 111, reducing (stage 330) mixture 111 to yield reduced mixture 121, adding at least binder material 92 to reduced mixture 121, and consolidating (stage 350) reduced mixture 121 with at least binder material 92 to form anode 135.

In certain embodiments, metalloid oxide and/or salt particles 95A may comprise metalloid oxide particles of at least one of Si, Ge and Sn; and/or salt particles of at least one of Si, Ge and Sn. For example, metalloid oxide and/or salt particles 95A may comprise tin oxide particles and/or tin salt particles, e.g., SnO, $SnO_2$ and/or $SnCl_2$ particles, respectively. For example, tin salt and/or oxide particles may provide 0.1%-30% (w/w) of mixture 111. Reducing 330 of mixture 111 respectively comprises reducing metalloid oxide and/or salt particles 95A in mixture 111.

In certain embodiments, carbon matrix 301 may comprise at least one of graphene oxide particles, hard carbon particles, graphite flakes and/or carbon black nanoparticles. For example, carbon matrix 301 may comprise graphene oxide particles 301 and reducing 330 of mixture 111 may comprise reducing the graphene oxide particles, e.g., by heating mixture 111 at a temperature in a range of 200° C. to 900° C. and in an inert or hydrogen rich atmosphere and/or by heating mixture 111 at a temperature in a range of 400° C. to 700° C. and in a hydrogen rich atmosphere. Alternatively or complementarily, reducing 330 may be carried out in a reducing solution mixture, e.g., sodium borohydride, at a temperature below 200° C. It is noted that carbon matrix 301 may participate in reduction 330 and/or act as the reducing agent, e.g., upon heating metalloid oxide and/or salt particles 95A such as tin salt in an inert atmosphere. Reduction 330 may be carried out e.g., by heating in an appropriate atmosphere (e.g., inert atmosphere with additional hydrogen), and/or at low temperatures in solution (e.g., a reducing solution comprising sodium borohydride).

In certain embodiments, mixing 310 may comprise milling carbon matrix 301 and Metalloid oxide and/or salt particles 95A such as the tin salt and/or oxide particles in a ball mill. Reduction 330 may be carried out in a stainless-steel container and evolving gases such as CO and/or $CO_2$ may be removed from the container during reduction 330 of mixture 111. In certain embodiments, method 300 may comprise bonding sulfonate groups 305 to carbon matrix 301 prior to mixing 310. For example, when carbon matrix 301 comprises graphene oxide particles, the sulfonate groups may be bound to the graphene oxide particles. In certain embodiments, method 300 may comprise bonding silicon nanoparticles (Si NP) 95D to carbon matrix 301 prior to mixing 310. For example, when carbon matrix 301 comprises graphene oxide particles, silicon nanoparticles 95D may be bonded to the graphene oxide particles.

Certain embodiments comprise anode(s) 135 for fast charging lithium ion batteries that are prepared by method 300. Anode(s) 135 may comprise reduced mixture 121 of carbon matrix 301 (comprising e.g., graphene oxide particles, hard carbon particles, graphite flakes and/or carbon black nanoparticles) with metalloid oxide and/or salt particles 95A (comprising e.g., SnO, $SnO_2$ and/or $SnCl_2$ particles, respectively), consolidated (e.g., with binder(s) and/or additive(s) 92) to form anode(s) 135. Sn-decorated graphene active material particles 125B may comprise reduced graphene with bonded reduced tin nanoparticles. The reduced graphene particles may be, e.g., 100-500 nm in diameter and the bonded reduced tin nanoparticles may be, e.g., 10-15 nm in diameter. Anode active material particles 125B may further comprise bonded silicon nanoparticles. In certain embodiments, sulfonate ($SO_3$) groups 305 may be used to attach the tin oxide and graphene oxide particles. In some embodiments, the reduced graphene-tin particles (with or without silicon) may be further coated with a carbon coating. Tin nanoparticles 95A may provide 0.1%-30% (w/w) of anode active material particles 125B, and/or tin oxide nanoparticles 95A may provide 0.1%-30% (w/w) of the mixture thereof with graphene oxide particles 301.

In various embodiments, lithium ion batteries may be prepared from disclosed anodes 135, possibly having a range of metalloid-based anode materials, e.g., as disclosed in U.S. Patent Publication No. 2017/0294687, incorporated herein by reference in its entirety. For example, the battery cells may have passivated anode active material that comprises silicon, at least as main component, and overall being metalloid-based (e.g., having >80% metalloids such as Si, Ge and Sn), in contrast to prior art cells that may have anode active material that mainly comprises graphite (e.g., >80% graphite) and may be decorated with metalloids (e.g., at <20 wt %).

In certain embodiments, polymerization of the anode coating and/or of coatings of the anode material particles may be controlled, as disclosed, e.g., in any of U.S. Patent Publication No. 2019/0198912 and 2019/0356013, incorporated herein by reference in their entirety. For example, anodes may be based on carbon (e.g., graphite, graphene or other carbon-based materials), metalloid anode material such as Si, Ge, Sn and their combinations and/or metals such as Li-metal.

Disclosed lithium ion batteries (and/or respective battery cells thereof) may at least partly be configured, e.g., by selection of materials, to enable operation at high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

Lithium ion batteries typically comprise anodes and cathodes with current collectors affixed thereto, packed with electrolyte and separator(s) in a battery pouch. Anodes are typically made of anode material particles, conductive additive(s) and binder(s), and may comprise any of the anode configurations taught, e.g., by U.S. Patent Publication No. 2017/0294687, incorporated herein by reference in its entirety. For example, anodes may be based on graphite, graphene or metalloid anode material such as Si, Ge, Sn and their combinations.

Cathodes may comprise materials based on layered, spinel and/or olivine frameworks, for example, at least one formulation comprising LiMeO wherein Me comprises one or more of Ni, Co, Fe, Mn, Al and Li and O comprise one or more respective lithium and oxygen atoms, e.g., LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof.

Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates, such as ethylene carbonate, diethyl carbonate, propylene carbonate, VC (vinylene carbonate), FEC (fluoroethylene carbonate), EA (ethyl acetate), EMC (ethyl methyl carbonate), DMC (dimethyl carbonate) and combinations thereof and/or solid electrolytes such as polymeric electrolytes such as polyethylene oxide, fluorine-containing polymers and copolymers (e.g., polytetrafluoroethylene), and combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Application Publication No. 2019/0148774, incorporated herein by reference in its entirety. Any of the additives disclosed in U.S. Patent Applications Publication Nos. 2019/0198912 and 2019/0356013, incorporated herein by reference in their entirety, may be used as additive in the electrolyte.

It is noted that the given values may be modified by ±10% of the respective value.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A method of preparing a Si-based anode slurry, the method comprising:
   milling silicon particles in an organic solvent to yield milled silicon particles, and in the same organic solvent and following a completion of the milling, adding to the milled silicon particles one or more added materials, without adding any other solvent, the one or more added materials are configured to act as at least one coating agent, at least one conductive additive and at least one binder to form the Si-based anode slurry.

2. The method of claim 1, wherein the organic solvent comprises at least one of: butanol, dipropylene glycol methyl ether, NMP (N-methyl-2-pyrrolidone), DMF (dimethylformamide), ethanol, propanol, pentanol, hexanol and/or cyclohexanol.

3. The method of claim 1, wherein the silicon particles have diameters between 1-30 μm and the milled silicon particles have diameters between 100-1200 nm.

4. The method of claim 1, further comprising adding tin particles to the same organic solvent.

5. The method of claim 4, wherein the tin particles have diameters between 20-700 nm.

6. The method of claim 1, wherein the at least one conductive additive comprises carbon, the at least one coating agent comprises graphite, and the at least one binder comprises PAA.

7. The method according to claim 1 wherein the adding and milling are executed while maintaining the organic solvent in a liquid state.

8. The method according to claim 1 wherein the adding and milling are executed without drying the organic solvent between the milling and the adding.

9. The method of claim 1, wherein the organic solvent comprises dipropylene glycol methyl ether.

10. The method of claim 1, wherein the organic solvent comprises NMP (N-methyl-2-pyrrolidone).

11. The method of claim 1, wherein the organic solvent comprises DMF (dimethylformamide).

12. The method of claim 1, wherein the organic solvent comprises hexanol and/or cyclohexanol.

13. The method of claim 1, wherein the milled silicon particles have diameters between 100-500 nm.

14. The method of claim 1, wherein the milled silicon particles have diameters between 300-700 nm.

15. The method of claim 1, wherein the milling is a wet ball milling.

16. The method of claim 1, comprising preparing the anode from the Si-based anode slurry to provide the anode, the anode is composed 42.6 percent in weight of milled silicon particles, 5.4 percent in weight of silver particles, 12% in weight of graphite, 20% in weight of conductive carbon, 20% in weight a PAA-based binder.

* * * * *